(12) United States Patent
Li et al.

(10) Patent No.: US 11,876,464 B2
(45) Date of Patent: Jan. 16, 2024

(54) SYSTEMS, METHODS AND DEVICES FOR NEURAL NETWORK CONTROL FOR IPM MOTOR DRIVES

(71) Applicant: THE BOARD OF TRUSTEES OF THE UNIVERSITY OF ALABAMA, Tuscaloosa, AL (US)

(72) Inventors: Shuhui Li, Northport, AL (US); Michael H. Fairbank, Colchester (GB)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 610 days.

(21) Appl. No.: 16/790,055

(22) Filed: Feb. 13, 2020

(65) Prior Publication Data
US 2020/0266743 A1 Aug. 20, 2020

Related U.S. Application Data

(60) Provisional application No. 62/805,478, filed on Feb. 14, 2019.

(51) Int. Cl.
*H02P 21/00* (2016.01)
*G06N 3/084* (2023.01)
(Continued)

(52) U.S. Cl.
CPC ........ *H02P 21/0014* (2013.01); *G05B 13/027* (2013.01); *G06N 3/044* (2023.01);
(Continued)

(58) Field of Classification Search
CPC .. H02P 21/00; H02P 21/0003; H02P 21/0014; H02P 21/0025; H02P 21/0085; H02P 21/0089; H02P 21/02; H02P 21/06; H02P 21/08; H02P 21/14; H02P 21/18; H02P 21/20; H02P 21/22; H02P 21/24; H02P 21/26; H02P 21/30; H02P 23/00; H02P 23/07; H02P 23/0004; H02P 23/0018; H02P 23/0031; H02P 23/14; H02P 23/009; H02P 23/30; H02P 27/06; H02P 27/08;
(Continued)

(56) References Cited

U.S. PATENT DOCUMENTS 9,754,204 B2 9/2017 Li et al.
10,211,763 B2 * 2/2019 Tian .......................... H02P 6/08
(Continued)

OTHER PUBLICATIONS

Yaqiang Li, "A Torque Observer for IPMSM Drives Based on Deep Neural Network", 2019, IEEE, 1530-1535 (Year: 2019).*
(Continued)

*Primary Examiner* — Antony M Paul
(74) *Attorney, Agent, or Firm* — Meunier Carlin & Curfman LLC

(57) ABSTRACT

Described herein is a method and system for controlling an interior-mounted permanent magnet (IPM) alternating-current (AC) electrical machine utilizing a space vector pulse-width modulated (SVPWM) converter operably connected between an electrical power source and the IPM AC electrical machine comprising three neural networks (NNs), including a controller NN operably connected to the SVPWM converter, a parameter estimator NN, and a flux-weakening and MTPA NN.

18 Claims, 10 Drawing Sheets

(51) Int. Cl.
    *H02P 27/12* (2006.01)
    *G05B 13/02* (2006.01)
    *H02P 21/22* (2016.01)
    *G06N 3/044* (2023.01)
    *G06N 3/045* (2023.01)

(52) U.S. Cl.
    CPC ............. *G06N 3/045* (2023.01); *G06N 3/084* (2013.01); *H02P 21/0025* (2013.01); *H02P 21/22* (2016.02); *H02P 27/12* (2013.01)

(58) Field of Classification Search
    CPC .... H02P 27/04; H02P 1/26; H02P 1/42; H02P 1/46; H02P 6/00; H02P 6/08; H02P 6/04
    USPC .......................................................... 706/23
    See application file for complete search history.

(56) References Cited

U.S. PATENT DOCUMENTS

| | | |
|---|---|---|
| 2014/0362617 A1 | 12/2014 | Li et al. |
| 2015/0039545 A1* | 2/2015 | Li ............................ G06N 3/08 706/23 |

OTHER PUBLICATIONS

An, et al., "On-line parameter identification for vector controlled PMSM drives using adaptive algorithm," in Proc. IEEE Vehicle Power Propulsion Conf., Sep. 2008, vol. 1, pp. 1-6.
Ankit Singh Pundir, "Electric Vehicle Market—Global Opportunity Analysis and Industry Forecast, 2017-2023," available @ https://www.alliedmarketresearch.com/electric-vehiclemarket.
Bhangu, B. S., and C. M. Bingham. "GA-tuning of nonlinear observers for sensorless control of automotive power steering IPMSMs." 2005 IEEE Vehicle Power and Propulsion Conference. IEEE, 2005.
Bishop, C.M. Neural Networks for Pattern Recognition, Oxford UP, 1995, pp. 55.
Boileau, B. Nahid-Mobarakeh, and F. Meibody-Tabar, "On-line Identification of PMSM Parameters: Model-Reference vs EKF," in conf. Rec. IEEE/IAS conf. Annu., pp. 1-8, 2008.
Boileau, N. Leboeuf, B. Nahid-Mobaraken, and F. Meibody-Tabar, "Online Identification of PMSM Parameters: Parameter Identifiability and Estimator Comparative Study," IEEE Trans. Industry Applications, vol. 47, No. 4, pp. 1994-1957, Jul./Aug. 2011.
Chalmers, B.J. "Influence of saturation in brushless permanent-magnet motor drives," IEE Proc. B—Electr. Power Appl. 1992, 139, 51-52.
Cho, Younghoon. "Improved Sensorless Control of Interior Permanent Magnet Sensorless Motors Using an Active Damping Control Strategy." Energies 9, No. 3 (2016): 135.
Choi, Chinchul, et al. "Experimental estimation of inductance for interior permanent magnet synchronous machine considering temperature distribution." IEEE transactions on magnetics 49.6 (2013): 2990-2996.
Consoli, Alfio, et al. "Steady-state and transient operation of IPMSMs under maximum-torque-per-ampere control." IEEE transactions on Industry Applications 46.1 (2010): 121-129.
Fairbank, M., Alonso, E. and Prokhorov, D., 2013. "An equivalence between adaptive dynamic programming with a critic and backpropagation through time." IEEE transactions on neural networks and learning systems, 24(12), pp. 2088-2100.
Fairbank, M., Li, S., Fu, X., Alonso, E. and Wunsch, D., 2014. "An adaptive recurrent neural-network controller using a stabilization matrix and predictive inputs to solve a tracking problem under disturbances." Neural Networks, 49, pp. 74-86.
Fairbank, M., Prokhorov, D. and Alonso, E., 2014. "Clipping in neurocontrol by adaptive dynamic programming." IEEE transactions on neural networks and learning systems, 25(10), pp. 1909-1920.
Fairbank, Michael, and Eduardo Alonso. "Efficient calculation of the Gauss-Newton approximation of the Hessian matrix in neural networks." Neural Computation 24.3 (2012): 607-610.
Fairbank, Michael, and Eduardo Alonso. "Value-gradient learning." The 2012 International Joint Conference on Neural Networks (IJCNN). IEEE, 2012, (pp. 1-8).
Fairbank, Michael, Eduardo Alonso, and Danil Prokhorov. "Simple and fast calculation of the second-order gradients for globalized dual heuristic dynamic programming in neural networks." IEEE transactions on neural networks and learning systems 23.10 (2012): 1671-1676.
Fu, X., Li, S., Fairbank, M., Wunsch, D.C. and Alonso, E., 2015. "Training recurrent neural networks with the Levenberg-Marquardt algorithm for optimal control of a grid-connected converter." IEEE transactions on neural networks and learning systems, 26(9), pp. 1900-1912.
Ha, et al., "Sensorless rotor position estimation of an interior permanent-magnet motor from initial states." IEEE Trans. Ind. Appl. 2003, 39, 761-767.
Hajian, Masood, et al. "Adaptive nonlinear direct torque control of sensorless IM drives with efficiency optimization." IEEE Transactions on Industrial Electronics 57.3 (2009): 975-985.
Jeong, I.; Nam, K. "Analytic expressions of torque and inductances via polynomial approximations of flux linkages," IEEE Trans. Magn. 2015, 51.
Jung, S.-Y.; Hong, J.; Nam, K. "Current minimizing torque control of the IPMSM using Ferrari's method," IEEE Trans. Power Electron. 2013, 28, 5603-5617.
Kasa, N.; Watanabe, H. "A mechanical sensorless control system for salient-pole brushless DC motor with autocalibration of estimated position angles." IEEE Trans. Ind. Electron. 2000, 47, 389-395.
Khan, Waqar. "Torque Maximizing and Flux Weakening Control of Synchronous Machines." (2016).
Kim, et al., "Torque control strategy of an IPMSM considering the flux variation of the permanent magnet," in Proc. IEEE 42nd Ind. Appl. Soc. Annu. Meet., 2007, pp. 1301-1307.
Kim, Ji-Won, et al. "A study on sensorless control of transverse flux rotating motor based on MRAS with parameter estimation." Journal of Power Electronics 11.6 (2011): 864-869.
Kim, Sungmin, Young-Doo Yoon, Seung-Ki Sul, and Kozo Ide. "Maximum torque per ampere (MTPA) control of an IPM machine based on signal injection considering inductance saturation." IEEE Transactions on Power Electronics 28, No. 1 (2013): 488-497.
Kwon, et al.,"Six-Step Operation of PMSM With Instantaneous Current Control," IEEE Trans. Ind. Appl., vol. 50, No. 4, pp. 2614-2625, Jul.-Aug. 2014.
Lee, Dong-Choon, and G-Myoung Lee. "A novel overmodulation technique for space-vector PWM inverters." IEEE transactions on Power Electronics 13.6 (1998): 1144-1151.
Li, Don C. Wunsch, Edgar O'Hair, and Michael G. Giesselmann, "Extended Kalman filter training of neural networks on a SIMD parallel machine", Journal of Parallel and Distributed Computing, vol. 62, No. 4, Apr. 1, 2002, pp. 544-562.
Li, Dong Zhang, Adam B. Roget and Zheng ONeill, "Integrating Building Energy Simulation and Dynamic Price for Demand Response Study," IEEE Trans. Smart Grid, 5(2), pp. 779-788, 2014.
Li, et al., "Application of information technology tools in teaching the course and laboratory of power electronics," in Proc. 2005 ASEE Annu. Conf., Portland, OR, Jun. 12-15, 2005.
Li, et al., "Applying IT tools to a laboratory course for measurement, analysis and design of electric and electronic circuits," IEEE Trans. on Education, vol. 48, No. 3, Aug. 2005, 520-530.
Li, et al., "Conventional and Novel Control Designs for Direct Driven PMSG Wind Turbines," Electric Power Syst. Research, vol. 80, pp. 328-338, Mar. 2010.
Li, et al., "Developing digital measurement and analysis laboratory in circuits and electronics lab at TAMUK," in Proc. 2004 ASEE Annu. Conf., Salt Lake City, UT, Jun. 20-23, 2004.
Li, et al., "Laboratory development and restructuring for the course of electric machinery using software and hardware IT tools," in Proc. 2005 ASEE Annu. Conf., Portland, OR, Jun. 12-15, 2005.

(56) References Cited

OTHER PUBLICATIONS

Li, et al., "Restructuring energy conversion course using an integrative approach and computer assisted teaching approaches," in Proc. 2004 ASEE Annu. Conf., Salt Lake City, UT, Jun. 20-23, 2004.

Li, Ke Bao, Xingang Fu, and Huiying Zheng, "Energy Management and Control of Electric Vehicle Charging Stations," Electric Power Components and Systems, vol. 42, No. 3-4, pp. 339-347, 2014.

Li, Michael Fairbank, Xingang Fu, Donald C. Wunsch, and Eduardo Alonso, "Vector Control of Permanent Magnet Synchronous Motor using Adaptive Recurrent Neural Networks", Proceedings of 2013 International Joint Conference on Neural Network, Dallas USA, Aug. 4-9, 2013.

Li, S., Fairbank, M., Fu, X., Wunsch, D. C. and Alonso, E. (2013). Nested-Loop Neural Network Vector Control of Permanent Magnet Synchronous Motors. In: India Conference, 2008. INDICON 2008. Annual IEEE. (pp. 81-86). IEEE. ISBN 978-1-4673-6128-6.

Li, S., Fairbank, M., Johnson, C., Wunsch, D.C., Alonso, E. and Proao, J.L., 2014. Artificial neural networks for control of a grid-connected rectifier/inverter under disturbance, dynamic and power converter switching conditions. IEEE transactions on neural networks and learning systems, 25(4), pp. 738-750.

Li, S., Fairbank, M., Wunsch, D. C. and Alonso, E. (2012). Vector Control of a Grid-Connected Rectifier/Inverter Using an Artificial Neural Network. Paper presented at the IEEE International Joint Conference on Neural Networks (IEEE IJCNN 2012), 1783-1789, Oct. 15, 2012, Brisbane, Australia.

Li, Shuhui, et al. "Artificial Neural Networks for Volt/VAR Control of DER Inverters at the Grid Edge." IEEE Transactions on Smart Grid 10.5 (2018): 5564-5573.

Li, Shuhui. "Wind power: Neural network control, multidisciplinary integration, and advanced simulation." (University of Alabama), 2011. Abstract.

Li, T.A. Haskew, and L. Xu, "Control of HVDC Light Systems using Conventional and Direct-Current Vector Control Approaches," IEEE Trans. Power Electron., 25(12), 2010, pp. 3106-3118.

Li, T.A. Haskew, Dawen Li and Fei Hu, "Integrating Photovoltaic and Power Converter Characteristics for Energy Extraction Study of Solar PV Systems," Renewable Energy (Elsevier), vol. 36, Issue 12, Dec. 2011, pp. 3238-3245.

Li, T.A. Haskew, K.A. Williams and R.P. Swatloski, "Control of DFIG Wind Turbine with Direct-Current Vector Control Configuration," IEEE Trans. Sustain. Energy, vol. 3, No. 1, 2012, pp. 1-11.

Li, T.A. Haskew, R.P. Swatloski, and W. Gathings, "Optimal and Direct-Current Vector Control of Direct-Driven PMSG Wind Turbines," IEEE Trans. Power Electronics, vol. 27, No. 5, May 2012, pp. 2325-2337.

Liu JB, Nondahl TA, Schmidt PB, et al. Rotor position estimation for synchronous machines based on equivalent EMF. IEEE T Ind Appl 2011; 47: 1310-1318.

Liu, et al., "Online multiparameter estimation of nonsalient-pole PM synchronous machines with temperature variation tracking," IEEE Trans. Ind. Electron., vol. 58, No. 5, pp. 1776-1788, May 2011.

Liu, Wenxin, Ganesh K. Venayagamoorthy, and Donald C. Wunsch. "A heuristic-dynamic-programming-based power system stabilizer for a turbogenerator in a single-machine power system." IEEE transactions on industry applications 41.5 (2005): 1377-1385.

Malek Ramezani, et al., "Analysis and Controller Design for Stand-Alone VSIs in Synchronous Reference Frame," IET Power Electronics, 10(9), Jul. 2017, pp. 1003-1012.

Malek Ramezani, et al., "Combining Droop and Direct Current Vector Control for Control of Parallel Inverters in Microgrid," IET Renewable Power Generation, vol. 11, Issue 1, Jan. 11, 2017, p. 107-114.

Matsui, N. "Sensorless PM brushless DC motor drives." IEEE Trans. Ind. Electron. 1996, 43, 300-308.

Morimoto, M. Sanada, and Y. Takeda, "Effects and compensation of magnetic saturation in flux-weakening controlled permanent magnet synchronous motor drives," IEEE Trans. Ind. Appl., vol. 30, No. 6, pp. 1632-1637, Dec. 1994.

Nalakath, Shamsuddeen, Matthias Preindl, and Ali Emadi. "Online multi-parameter estimation of interior permanent magnet motor drives with finite control set model predictive control." IET Electric Power Applications 11, No. 5 (2017): 944-951.

Omrane, Ines, Erik Etien, Olivier Bachelier, and Wissam Dib. "A simplified least squares identification of permanent magnet synchronous motor parameters at standstill." In Industrial Electronics Society, IECON 2013—39th Annual Conference of the IEEE, pp. 2578-2583. IEEE, 2013.

Orlowska-Kowalska and M. Dybkowski, "Stator-current-based MRAS estimator for a wide range speed-sensorless induction-motor drive," IEEE Trans. Ind. Electron., vol. 57, No. 4, pp. 1296-1308, Apr. 2010.

P. J. Werbos, "Backpropagation through time: What it does and how to do it," Proc. IEEE, vol. 78, No. 10, pp. 1550-1560, 1990.

P. J. Werbos, "Backwards differentiation in AD and neural nets: Past links and new opportunities," in Automatic Differentiation: Applications, Theory, and Implementations, ser. Lecture Notes in Computational Science and Engineering, H. M. Bucker, G. Corliss, P.Hovland, U. Naumann, and B. Norris, Eds. Springer, 2005, pp. 15-34.

P. J. Werbos, "Neural networks, system identification, and control in the chemical process industries," in Handbook of Intelligent Control, White and Sofge, Eds., New York: Van Nostrand Reinhold, 1992, pp. 283-356.

Pellegrino, Gianmario, et al. "Performance comparison between surface-mounted and interior PM motor drives for electric vehicle application." IEEE Transactions on Industrial Electronics 59.2 (2012): 803-811.

Piippo, A.; Hinkkanen, M.; Luomi, J. Analysis of an adaptive observer for sensorless control of interior permanent magnet synchronous motors. IEEE Trans. Ind. Electron. 2008, 55, 570-576.

Prokhorov, Danil V., L. A. Feldkarnp, and I. Yu Tyukin. "Adaptive behavior with fixed weights in RNN: an overview." In Neural Networks, 2002. IJCNN'02. Proceedings of the 2002 International Joint Conference on, vol. 3, pp. 2018-2022. IEEE, 2002.

Raca, D.; Garcia, P.; Reigosa, D.D.; Briz, F.; Lorenz, R.D. Carrier-signal selection for sensorless control of PM synchronous machines at zero and very low speeds. IEEE Trans. Ind. Appl. 2010, 46, 167-178.

Rahman, et al., "Advances on IPM technology for hybrid electric vehicles." 2009 IEEE Vehicle Power and Propulsion Conference, 2009.

Rang, et al., "A MTPA control scheme for an IPM synchronous motor considering magnet flux variation caused by temperature," in Proc. IEEE Appl. Power Electron. Conf. Expo., 2004, pp. 1617-1621.

Rao, M. Buss, and V. Utkin, "Simultaneous state and parameter estimation in induction motors using first- and second-order sliding modes," IEEE Trans. Ind. Electron., vol. 56, No. 9, pp. 3369-3376, Sep. 2009.

Reigosa, D.D.; Garcia, P.; Raca, D.; Briz, F.; Lorenz, R.D. Measurement and adaptive decoupling of cross-saturation effects and secondary saliencies in sensorless controlled IPM synchronous machines. IEEE Trans. Ind. Appl. 2008, 44, 1758-1767.

Shi, J.L.; Liu, T.H.; Chang, Y.C. Position control of an interior permanent-magnet synchronous motor without using a shaft position sensor. IEEE Trans. Ind. Electron. 2007, 54, 1989-2000.

Shi, Yuchao, Kai Sun, Lipei Huang, and Yongdong Li. "Online identification of permanent magnet flux based on extended Kalman filter for IPMSM drive with position sensorless control." IEEE Transactions on Industrial Electronics 59, No. 11 (2012): 4169-4178.

Solsona JA, Valla MI and Muravchik C. Nonlinear control of a permanent magnet synchronous motor with disturbance torque estimation. IEEE T Energy Conver 2000; 15:163-168.

Underwood and Husain, "Online parameter estimation and adaptive control of permanent-magnet synchronous machines," IEEE Trans. Ind. Electron., vol. 57, No. 7, pp. 2435-2443, Jul. 2010.

(56) References Cited

OTHER PUBLICATIONS

Venayagamoorthy, "Applications of approximate dynamic programming in power systems control," in Handbook of Learning and Approximate Dynamic Programming, J. Si, A. Barto, W. Powell, and D. C. Wunsch (Eds.). Wiley, Jul. 2004, pp. 479-515.

Venayagamoorthy, R.G. Harley, and D.C. Wunsch, "Implementation of adaptive critic based neurocontrollers for turbogenerators in a multimachine power system," IEEE Trans. on Neural Networks—Special Issue on Hardware Implementations, vol. 14, No. 5, Sep. 2003.

Wang, Fei-Yue, Huaguang Zhang, and Derong Liu. "Adaptive dynamic programming: An introduction." IEEE computational intelligence magazine 4.2 (2009): 39-47.

Wlas, et al., Neural-network-based parameter estimations of induction motors, IEEE Trans. Ind. Electron., vol. 55, No. 4, pp. 1783-1794, Apr. 2008.

Yang, Dooyoung, Hyungsoo Mok, Jusuk Lee, and Soohee Han. "Adaptive Torque Estimation for an IPMSM with Cross-Coupling and Parameter Variations." Energies 10, No. 2 (2017):167.

Yang, Yongliang, et al. "Leader-follower output synchronization of linear heterogeneous systems with active leader using reinforcement learning." IEEE transactions on neural networks and learning systems 29.6 (2018): 2139-2153.

Yu, et al., "Levenberg-Marquardt training," Industrial Electronics Handbook, vol. 5—Intelligent Systems, 2nd ed., chapter 12, pp. 12-1 to 12-15, CRC Press, 2011.

Zaky, et al., "Widespeed-range estimation with online parameter identification schemes of sensorless induction motor drives," IEEE Trans. Ind. Electron., vol. 56, No. 5, pp. 1699-1707, May 2009.

Zhang G, Wang G, Xu D, et al. ADALINE-network based PLL for position sensorless interior permanent magnet synchronous motor drives. IEEE T Power Electr 2016; 31: 1450-1460.

Zhao Y, Zhang Z, Qiao W, et al. An extended flux model-based rotor position estimator for sensorless control of salient-pole permanent-magnet synchronous machines. IEEE T Power Electr 2015; 30: 4412-4422.

Zhou, et al., "Relationship between space-vector modulation and three-phase carrier-based PWM: a comprehensive analysis," IEEE Trans. Ind. Electron., 49(1), (2002):186-196.

Zhu G, Kaddouri A, Dessaint LA, et al. A nonlinear state observer for the sensorless control of a permanentmagnet AC machine. IEEE T Ind Electron 2001; 48: 1098-1108.

\* cited by examiner

SYSTEMS, METHODS AND DEVICES FOR NEURAL NETWORK CONTROL FOR IPM MOTOR DRIVES

CROSS-REFERENCE TO RELATED APPLICATIONS

This application claims priority to provisional patent application Ser. No. 62/805,478 filed on Feb. 14, 2019 and titled "SYSTEMS, METHODS AND DEVICES FOR NEURAL NETWORK CONTROL FOR IPM MOTOR DRIVES." The disclosure of which is hereby incorporated by reference in its entirety.

BACKGROUND

There are two main types of the permanent magnet (PM) synchronous motors used in electric vehicles (EVs): surface-mounted PM (SPM) motors and interior-mounted PM (IPM) motors. For an SPM motor, the magnets of the motor are on the surface of the rotor. For an IPM motor, the magnets are buried inside the rotor. Due to the requirement of a large operating speed range for an electric vehicle, IPM motors are widely used in the EV industry.

Efficiency and torque are important factors for EVs. In terms of PM motors for EVs, improving efficiency and driving torque requires 1) minimizing energy loss and 2) maximizing voltage utilization. From the energy loss perspective, at each EV operating condition, an efficient reference command needs to be generated for control of an IPM motor which requires accurate motor parameter information. From the voltage utilization standpoint, it is usually required to extend the motor operation from linear to over or even six-step modulation regions.

Therefore, what is desired are improved control, parameter estimation, and optimization systems for controlling and operating interior-mounted permanent magnet motors using multiple neural networks, including an ANN-based ADP for an IPM, as well as neural network based sensorless speed estimation methods.

SUMMARY

Methods, systems and devices are described for improving the performance of IPM motors in EVs by use of one or more of: 1) a neural network (NN) controller trained according to the approximate dynamic programming (ADP) principle to provide the most efficient and reliable control solution for IPM motor operation in linear, over and six-step modulation regions; 2) an NN estimator to identify practical IPM motor parameters at different real-time operating conditions; and 3) an NN mapper to replace the traditional lookup table mechanism for more accurate mapping from stator d- and q-axis currents to motor parameters. Overall, new and intelligent technologies are utilized to greatly enhance EV motor driving torque, efficiency, reliability and adaptivity, which results in a potentially transformational impact to automobile industry.

Described herein is a method and system for controlling an interior-mounted permanent magnet (IPM) alternating-current (AC) electrical machine utilizing a space vector pulse-width modulated (SVPWM) converter operably connected between an electrical power source and the IPM AC electrical machine and a configuration comprising three neural networks (NNs), including a controller NN operably connected to the SVPWM converter, a parameter estimator NN, and a flux-weakening and MTPA NN. The controller NN integrates one or more of conventional PI (proportional-integral) control techniques, predictive control techniques, PR (proportional-resonant) control techniques, optimal control techniques and sliding mode control characteristics together into one controller to provide high performance drives for IPM motor operating in linear modulation or overmodulation conditions. The estimator NN estimates motor parameters in real-time and provides a high-performance sensor-less control technology so as to reduce motor cost and size, probability of failure, and boost motor reliability. The flux-weakening and MTPA NN generates optimal d- and q-axis current references based on variable motor parameters obtained from the estimator NN so as to allow the controller NN to drive the IPM motor efficiently.

Embodiments of a method for controlling an interior-mounted permanent magnet (IPM) alternating-current (AC) electrical machine are disclosed herein. In one embodiment, a space vector pulse-width modulated (SVPWM) converter operably connected between an electrical power source and the IPM AC electrical machine is provided. A neural network vector control system is operably connected to the SVPWM converter, the neural network vector control system comprises a controller neural network configured and trained to implement an approximate dynamic programming (ADP) algorithm, wherein the neural network vector control system is trained at times when the IPM AC electrical machine is not operating. A parameter estimator neural network is provided. The parameter estimator neural network receives as inputs actual d and q-axis currents and actual d and q-axis voltages representative of current and voltage output from the SVPWM converter, wherein the parameter estimator neural network captures and estimates parameters for the IPM AC electrical machine. An adjustable IPM motor model is applied with the parameter estimator neural network to provide estimated d and q-axis currents, wherein the estimated d and q-axis currents are compared with the actual d and q-axis currents and are fed back as inputs to the estimator neural network, and the parameter estimator neural network is trained to implement an ADP algorithm and the parameter estimator neural network system is trained at times when the IPM AC electrical machine is not operating. A flux weakening and maximum torque per ampere (MTPA) neural network is provided. The flux-weakening and MTPA neural network receives as an input a desired torque command and receives as inputs from the parameter estimator neural network $L_d$, $L_q$, $\omega_e$, and $\Psi_{pm}$, wherein $L_d$ and $L_q$ are stator d- and q-axis inductances, $\omega_e$ is the IPM AC electrical machine's electrical rotational speed, and $\Psi_{pm}$ is a flux linkage of a permanent rotor magnet of the IPM AC electrical machine, and wherein the rotor position of the IPM AC electrical machine is estimated from $\omega_e$ using the parameter estimator neural network and the rotor position is used to convert the current and voltage outputs from the SVPWM converter to their d and q-axis currents and d and q-axis voltages representative of current and voltage output from the SVPWM converter.

In some embodiments, the neural network vector control system includes controller neural network, wherein the controller neural network is a feedforward network comprising an input layer, multiple hidden layers and an output layer, wherein the controller neural network: receives a plurality of inputs at the input layer, wherein the plurality of inputs include at least reference d and q-axis stator currents from the flux-weakening and MTPA neural network and receives d and q-axis actual stator currents as well as other signals that can be generated from the reference and actual d and q-axis stator currents, such as error signals between the reference and actual stator currents and integrals of the error signals; outputs a compensating dq-control voltage at the output layer, wherein the controller neural network is configured to optimize the compensating dq-control voltage based on the plurality of inputs; and controls the SVPWM converter using the compensating dq-control voltage. The controller neural network is trained as a recurrent network to minimize a cost function of the ADP algorithm using a forward accumulation through time ("FATT") algorithm. The cost function can be used to measure how close the actual motor d and q-axis stator currents match the reference d and q-axis stator currents and the controller neural network is trained offline at times when the IPM AC electrical machine is not operating.

In some embodiments the parameter estimator neural network is a feedforward network comprising an input layer, multiple hidden layers and an output layer, wherein said parameter estimator neural network: receives a plurality of inputs at the input layer, wherein the plurality of inputs include at least d and q-axis actual stator currents and estimated d and q-axis stator currents from an adjustable IPM motor model as well as other signals that can be generated from the actual and estimated d and q-axis stator currents, such as error signals between the estimated and actual stator currents and integrals of the error signals; outputs estimated motor parameters $L_d$, $L_q$, $\omega_e$, and $\Psi_{pm}$ at the output layer, wherein the parameter estimator neural network together with adjustable IPM motor model is configured to optimize the IPM motor parameter estimation based on the plurality of inputs. The parameter estimator neural network is trained as a recurrent network to minimize a cost function of the ADP algorithm using a forward accumulation through time ("FATT") algorithm, wherein the cost function can be used to measure how close the estimated d and q-axis stator currents from the adjustable IPM motor model match the actual d and q-axis stator currents. The adjustable IPM motor model receives estimated motor parameters $L_d$, $L_q$, $\omega_e$, and $\Psi_{pm}$ from the parameter estimator neural network as well as the actual d and q-axis stator voltages of the IPM motor, and outputs the estimated d and q-axis stator currents. The parameter estimator neural network is trained offline at times when the IPM AC electrical machine is not operating, wherein from the estimated motor parameters, an electrical rotational speed of the IPM AC electrical machine and a rotor position of the IPM AC electrical machine can be obtained, and wherein the estimated electrical rotational speed and the estimated rotor position can enable sensorless control for an IPM AC electrical machine.

In some embodiments, the flux-weakening and MTPA neural network is a feedforward network comprising an input layer, multiple hidden layers and an output layer, wherein the flux-weakening and MTPA neural network: receives a plurality of inputs at the input layer, wherein the plurality of inputs include at least a reference torque as well as estimated motor parameters $L_d$, $L_q$, $\omega_e$, and $\Psi_{pm}$ from the parameter estimator neural network; and outputs reference d and q-axis stator currents to the controller neural network at the output layer. The flux-weakening and MTPA neural network is trained to minimize a cost function using a Levenberg-Marquardt or backpropagation training algorithm, wherein the cost function can be used to measure how close the reference d and q-axis stator currents from the flux-weakening and MTPA neural network match the ideal optimal reference d and q-axis stator currents for different reference torque and motor parameters. The flux-weakening and MTPA neural network is trained offline at times when the IPM AC electrical machine is not operating.

In various applications, the disclosed IPM AC electric motor can be used in an electric vehicle, industrial robot, or electric drone.

In some instances, the electrical power source comprises a battery or other dc power sources.

Also disclosed herein are embodiments of a system for controlling an interior-mounted permanent magnet (IPM) alternating-current (AC) electrical machine. One embodiment of the system comprises a space vector pulse-width modulated (SVPWM) converter operably connected between an electrical power source and the IPM AC electrical machine; a neural network vector control system operably connected to the SVPWM converter, the neural network vector control system comprising a processor and a controller neural network configured to implement an approximate dynamic programming (ADP) algorithm for training the neural network vector control system when the IPM AC electrical machine is not operating; a parameter estimator neural network operably connected to an output of the SVPWM converter through a dq-axis converter, wherein the parameter estimator neural network comprises a processor and wherein the parameter estimator neural network is configured to receive as inputs d and q-axis currents and d and q-axis voltages representative of current and voltage output from the SVPWM converter, captures and estimates parameters for the IPM AC electrical machine including at least an electrical rotational speed of the IPM AC electrical machine and a rotor position of the IPM AC electrical machine, and implement an ADP training algorithm, wherein an adjustable IPM motor model is applied with the parameter estimator neural network to provide the estimated d and q-axis currents, wherein the estimated d and q-axis currents are compared with the actual d and q-axis currents and fed-back as inputs to the estimator neural network, wherein the parameter estimator neural network system is trained at times when the IPM AC electrical machine is not operating; a flux weakening and maximum torque per ampere (MTPA) neural network operably connected to the neural network vector control system and the parameter estimator neural network, wherein the flux-weakening and MTPA neural network comprises at least a processor and is configured to receive as an input a desired torque command and receive as inputs from the parameter estimator neural network $L_d$, $L_q$, $\omega_e$, and $\Psi_{pm}$, wherein $L_d$ and $L_q$ are stator d- and q-axis inductances, $\omega_e$ is the IPM AC electrical machine's electrical rotational speed, and $\Psi_{pm}$ is a flux linkage of a permanent rotor magnet of the IPM AC electrical machine, and wherein the rotor position of the IPM AC electrical machine is estimated from $\omega_e$ using the parameter estimator neural network and the rotor position is used to convert the current and voltage outputs from the SVPWM converter to their d and q-axis currents and d and q-axis voltages representative of current and voltage output from the SVPWM converter.

In some embodiments, the controller neural network is a feedforward network comprising an input layer, multiple hidden layers and an output layer, wherein the controller neural network: receives a plurality of inputs at the input layer, wherein the plurality of inputs include at least reference d and q-axis stator currents from the flux-weakening and MTPA neural network and receives d and q-axis actual stator currents as well as other signals that can be generated from the reference and actual d and q-axis stator currents, such as error signals between the reference and actual stator currents and integrals of the error signals; outputs a compensating dq-control voltage at the output layer, wherein the controller neural network is configured to optimize the compensating dq-control voltage based on the plurality of inputs; and controls the SVPWM converter using the compensating dq-control voltage, wherein the controller neural network is trained as a recurrent network to minimize a cost function of the ADP algorithm using a forward accumulation through time ("FATT") algorithm, wherein the cost function can be used to measure how close the actual motor d and q-axis stator currents match the reference d and q-axis stator currents, wherein the controller neural network is trained offline at times when the IPM AC electrical machine is not operating.

In some embodiments, the parameter estimator neural network is a feedforward network comprising an input layer, multiple hidden layers and an output layer, wherein said parameter estimator neural network: receives a plurality of inputs at the input layer, wherein the plurality of inputs include at least d and q-axis actual stator currents and estimated d and q-axis stator currents from an adjustable IPM motor model as well as other signals that can be generated from the actual and estimated d and q-axis stator currents, such as error signals between the estimated and actual stator currents and integrals of the error signals; and outputs estimated motor parameters $L_d$, $L_q$, $\omega_e$, and $\Psi_{pm}$ at the output layer, wherein the parameter estimator neural network together with adjustable IPM motor model is configured to optimize the IPM motor parameter estimation based on the plurality of inputs; wherein the parameter estimator neural network is trained as a recurrent network to minimize a cost function of the ADP algorithm using a forward accumulation through time ("FATT") algorithm, wherein the cost function can be used to measure how close the estimated d and q-axis stator currents from the adjustable IPM motor model match the actual d and q-axis stator currents, wherein the adjustable IPM motor model receives estimated motor parameters $L_d$, $L_q$, $\omega_e$, and $\Psi_{pm}$ from the parameter estimator neural network as well as the actual d and q-axis stator voltages of the IPM motor, and outputs the estimated d and q-axis stator currents, wherein the parameter estimator neural network is trained offline at times when the IPM AC electrical machine is not operating, wherein from the estimated motor parameters, an electrical rotational speed of the IPM AC electrical machine and a rotor position of the IPM AC electrical machine can be obtained, wherein the estimated electrical rotational speed and the estimated rotor position can enable sensorless control for an IPM AC electrical machine.

In some embodiments, the flux-weakening and MTPA neural network is a feedforward network comprising an input layer, multiple hidden layers and an output layer, wherein the flux-weakening and MTPA neural network: receives a plurality of inputs at the input layer, wherein the plurality of inputs include at least a reference torque as well as estimated motor parameters $L_d$, $L_q$, $\omega_e$, and $\Psi_{pm}$ from the parameter estimator neural network; and outputs reference d and q-axis stator currents to the controller neural network at the output layer; wherein the flux-weakening and MTPA neural network is trained to minimize a cost function using a Levenberg-Marquardt or backpropagation training algorithm, wherein the cost function can be used to measure how close the reference d and q-axis stator currents from the flux-weakening and MTPA neural network match the ideal optimal reference d and q-axis stator currents for different reference torque and motor parameters, wherein the flux-weakening and MTPA neural network is trained offline at times when the IPM AC electrical machine is not operating.

In some instances, the disclosed systems can be used where an IPM AC electric motor is used in an electric vehicle, industrial robot, or electric drone. In some instances, the electrical power source of the system comprises a battery or other dc power sources.

Other systems, methods, features and/or advantages will be or may become apparent to one with skill in the art upon examination of the following drawings and detailed description. It is intended that all such additional systems, methods, features and/or advantages be included within this description and be protected by any accompanying claims in this application or any application that claims priority to this application.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
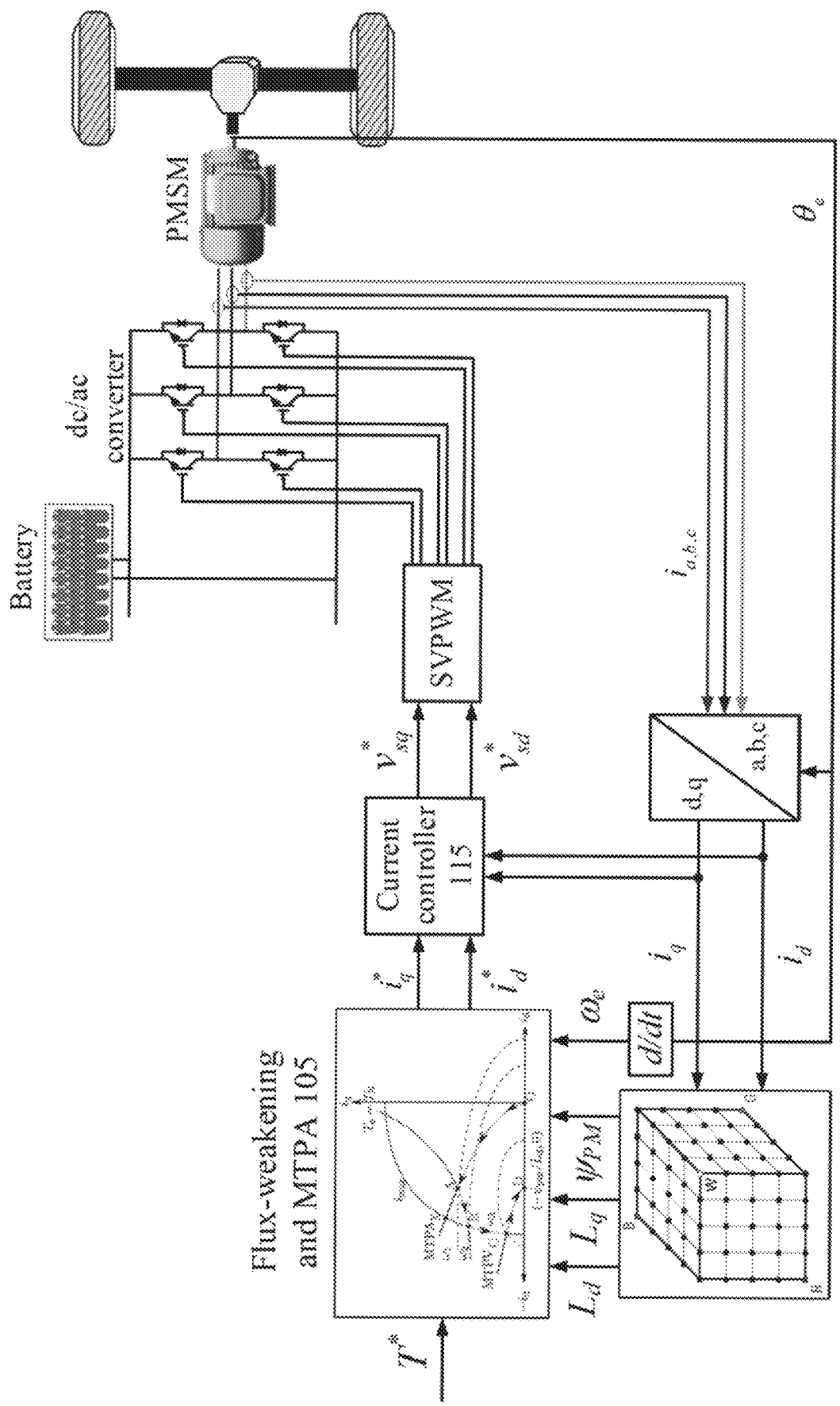
FIG. 1 shows a simple schematic of a conventional IPM motor drive and control structure.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising", and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present methods and systems may be understood more readily by reference to the following detailed description of preferred embodiments and the examples included therein and to the Figures and their previous and following description.

Stringent emission laws & regulations and increased demand for fuel-efficient, high-performance vehicles are compelling the automobile manufacturers worldwide to equip their vehicles with alternative fuel technologies, resulting in increased overall market adoption of electric vehicles (EVs). The global EV market was valued at $103,342 million in 2016, and is projected to reach $350,963 million by 2023, growing at a CAGR of 19.8% from 2017 to 2023. The key EV manufacturers such as Toyota Motor Corporation, Volkswagen AG, and Tesla, expanded their business by opening various research and manufacturing facilities globally. In addition, they have launched more efficient and advanced EVs to enhance their market share.

However, due to the limited space within an EV, high performance and efficiency of EV electric and electronic components is critical for the growth of the EV market. One of the most important EV components is electric motors. EVs use one or more electric motors or traction motors for propulsion. The most widely used electric motor in the automobile industry are permanent magnet synchronous motors (PMSM). There are two main types of permanent magnet (PM) motors: SPM motors and IPM motors. Due to the requirement for operation over a wide speed range, IPM motors, suitable to operate at both low and high speeds, are the primary motor used by the EV industry. Significant R&D investment has been made by the automobile companies to improve IPM motor performance, efficiency and reliability to meet EV operation requirements over a variety of conditions.

To improve performance, efficiency and reliability of IPM motors, it is desired to 1) minimize energy loss, 2) maximize voltage utilization especially for driving torque demand at high speed, and 3) implement sensorless-based control technology. From an energy loss perspective, at each EV operating condition, an efficient reference command may be generated for control of an IPM motor. From a voltage utilization standpoint, space vector pulse width modulation (SVPWM) is usually used, instead of the traditional sinusoidal pulse width (SPWM) modulation scheme, for controlling an IPM motor through power inverters. Further improvement of efficiency requires SVPWM to be extended from traditional linear modulation regions to over modulation regions. From a sensorless control viewpoint, the automobile industry has researched sensorless control technologies for years in order to reduce the cost and improve the reliability for EV driving.

Presently, like other ac electric machines, an IPM is controlled based on vector control technology. A typical conventional field-oriented vector controller for an IPM motor has two decoupled d- and q-axis current controllers to fulfill the magnetic field and torque control of the motor, respectively. In practical EV applications, a reference torque is first generated according to the driving requirement of an EV under different road conditions. Then, the torque reference is converted into d- and q-axis current references. The torque of an IPM motor is related to the stator current of the motor by the equation (1):

$$\tau_{em} = p(\Psi_{pm} i_{sq} + (L_d - L_q) i_{sd} i_{sq}) \quad (1)$$

where p is pole pairs, $i_{sd}$ and $i_{sq}$ are the d- and q-axis components of instant stator current, $L_d$ and $L_q$ are the stator d- and q-axis inductances, and $\Psi_{pm}$ is the flux linkage produced by the permanent magnet. If the torque computed from (1) is positive, the motor operates in a drive mode; otherwise, it operates in a regenerating mode.

According to (1), for a given torque command $\tau^*_{em}$, there are multiple current vectors that can generate the specified torque. The current vector, which has a minimum magnitude, is called the maximum torque per ampere (MTPA) current and represents the operating condition of the minimum copper loss for the commanded torque. However, determination of the current references needs to consider two additional constraints: the rated current limit Idq_max of the motor and the PWM saturation limit, considering the maximum voltage Vdq_max that can be generated by the power inverter and applied to the motor. This would result in an optimization formulation as shown by:

$$\text{Minimize: } |i_{s\_dq}| = \sqrt{i_{sd}^2 + i_{sq}^2}$$

$$\text{Subject to: } \tau^*_{em} = p(\Psi_{pm} i_{sq} + (L_d - L_q) i_{sd} i_{sq}),$$
$$\sqrt{i_{sd}^2 + i_{sq}^2} \leq I_{dq\_max}, \sqrt{v_{sd}^2 + v_{sq}^2} \leq V_{dq\_max}$$

To solve the optimization problem efficiently, it is needed to have accurate information about motor parameters such as Ld, Lq and Ψpm which however are dependent on the stator current $i_{sd}$ and $i_{sq}$ and can also change over time as the EV condition changes from new to used. Conventionally, determining an optimal dq current and the control of the IPM motor are built together as shown by FIG. 1, in which the three fundamental blocks are a flux-weakening and MTPA block 105, a lookup-table block 110 and a current-controller block 115. The lookup-table block 110 provides motor parameters based on measured motor current, the flux-weakening and MTPA block 105 generates optimal d- and q-axis reference currents, based on the motor parameters provided by the lookup-table block 110 and a desired torque demand $\tau^*_{em}$ that is needed for driving an EV, and the current-controller block 115 tracks the reference currents generated by the flux-weakening and MTPA block 105 or tracks the reference currents as much as possible in over modulation modes due to the physical constraint limitations, in terms of the rated current and PWM saturation limits, of an IPM motor. In FIG. 1, the motor speed and position are typically measured by using optical sensors.

However, there are several limitations associated with the existing IPM motor drive and control technology. First, the existing standard vector-control technology for an IPM motor is developed by using an inaccurate decoupling mechanism, which causes inefficient and unreliable operation of an IPM motor especially in over and six-step modulation regions. Second, in the present automobile industry, the motor parameters saved in the lookup table 110 are predetermined at the manufacture stage. However, in actual operating conditions, the motor parameters could change from their predetermined values and could also be different between any two motors that even belong to the same motor type. In addition, motor parameters saved using the lookup table 110 approach are discrete and multidimensional, which reduces the efficiency and accuracy to obtain actual motor parameters under complicated motor operating conditions. Third, the flux-weakening and MTPA block 105 shown in FIG. 1 requires solving the optimization problem, which is very time consuming and impossible to implement by using a real-time DSP system. Thus, the existing approaches either use simplified and inaccurate "optimization" methods or use a lookup table 110 in order to avoid solving the optimization problem, which reduces the accuracy of the flux weakening plus MTPA block 105 and efficiency of IPM motor drives and control. Fourth, the measurement of rotor speed and position using optical encoders increases motor cost, size and probability of failure, and reduces motor reliability. As a result, the sensorless control technologies have been attracting attention to the automobile industry over the past two decades, and significant research efforts have been made.

For such situations, artificial neural networks (NNs), as universal function approximators, would be the most suitable to help overcoming the challenges. Overall, as disclosed herein, a conventional IPM current controller is replaced with a NN controller trained according to approximate dynamic programming (ADP), the conventional lookup table 110 is replaced with an NN estimator to capture real-time IPM motor parameters as well as rotor speed and position, and the flux weakening plus MTPA block 105 is replaced by an NN that can quickly provide an optimal flux-weakening and MTPA solution in real-time conditions.

Figure 2:
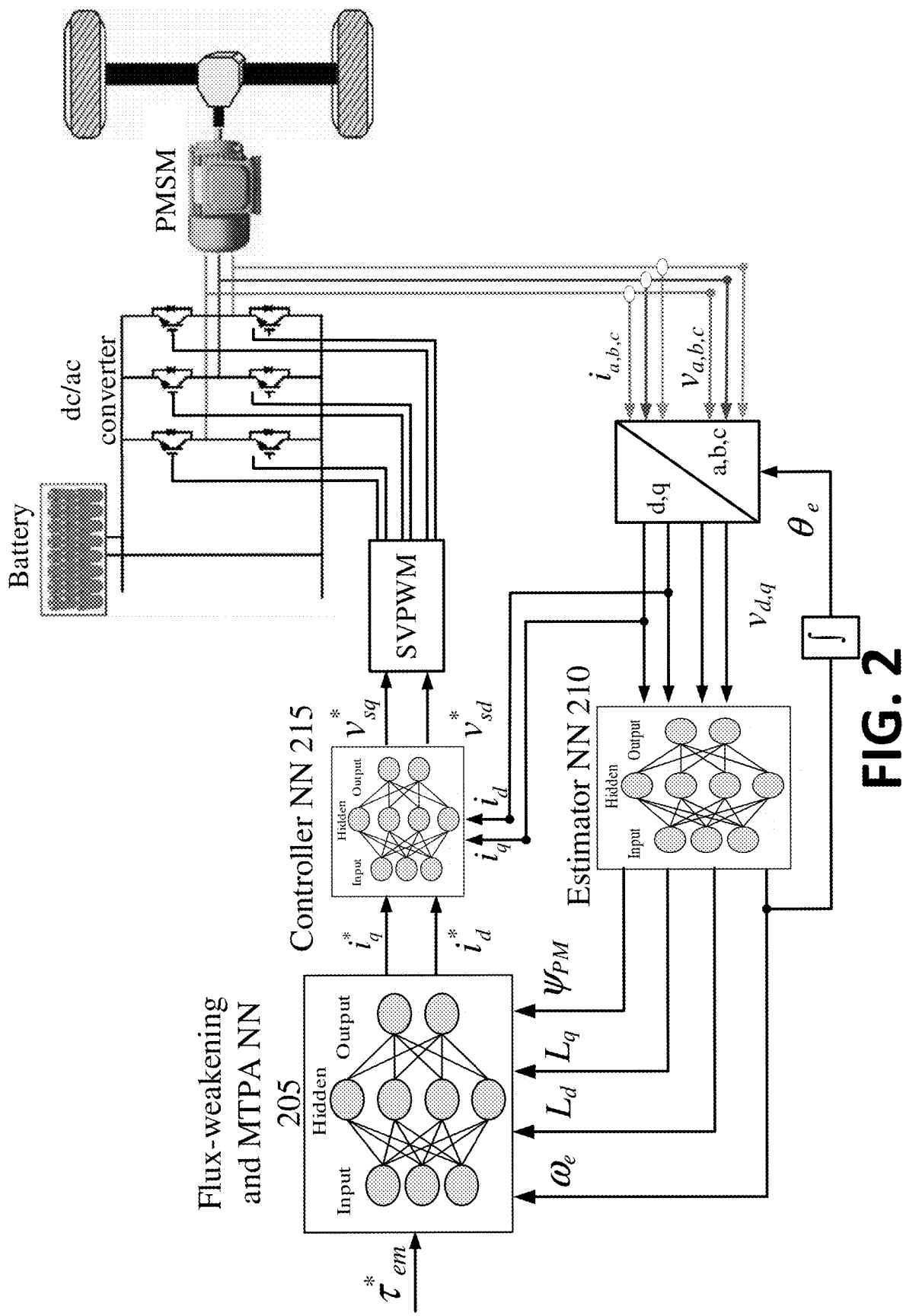
FIG. 2 illustrates an embodiment of a neural network (NN)-based IPM motor drive and control structure.

FIG. 2 is an overview illustration of the use of neural networks for IPM motor drives and control. As shown, the flux-weakening and MTPA block 105 has been replaced with a flux-weakening and MTPA neural network 205, the lookup table block 110 has been replaced with an estimator neural network 210, and the current-controller block 115 has been replaced with a controller neural network 215.

The IPM motor controller uses the controller NN 215 instead of the conventional PI (proportional-integral) control technique. The controller NN 215 is trained offline based on ADP principles. The ADP-based NN control technique has the potential to integrate conventional PI, predictive, PR (proportional-resonant), optimal, and sliding mode control characteristics together into one controller, making it a "super" controller to meet the IPM motor drive needs in challenging and uncertain EV operating conditions.

Also, the motor parameter estimator uses the estimator NN 210 to capture and estimate practical motor parameters and motor speed and position which may be changing over time and affected by varying motor operating environments. The estimator NN 210 is also trained based on ADP so that it can provide accurate, predictive motor-parameter estimation based on motor operation from time sequence points of view. This ADP-NN based parameter estimation technique has potential to integrate traditional motor-parameter estimation methods together to provide the most accurate estimation of motor parameters for flux-weakening and MTPA management and for sensorless control of an IPM motor.

Further, the flux-weakening and MTPA NN 205 may be an NN approximator and may be used to replace the flux-weakening and MTPA block 105. This is due to the fact that the optimization problem described herein is time consuming and usually requires a minimum time of 10 s seconds and above to solve, making it unable to meet real-time control demand of the motor controller. Hence, traditional approaches use simplified techniques, such as lookup tables, to avoid solving the optimization problem, which certainly affect flux-weakening and MTPA effectiveness. A well-trained neural network can overcome these challenges and is capable of adapting in real time to changing conditions without the need for retraining.

The equation (2) shows the state-space equation of an IPM motor, in which Rs is the resistance of the stator winding; $L_d$ and $L_q$ are the stator d- and q-axis inductances; $\omega_e$ is the motor electrical rotational speed; $v_{sd}$, $v_{sq}$, $i_{sd}$ and $i_{sq}$ are the d and q components of the instant stator voltage and current, $\Psi_{pm}$ is the flux of the rotor magnet.

$$\frac{d}{dt}\begin{bmatrix} i_{sd} \\ i_{sq} \end{bmatrix} = -\begin{bmatrix} R_s/L_d & -\omega_e L_q/L_d \\ \omega_e L_d/L_q & R_s/L_q \end{bmatrix}\begin{bmatrix} i_{sd} \\ i_{sq} \end{bmatrix} + \begin{bmatrix} v_{sd}/L_d \\ v_{sq}/L_q \end{bmatrix} - \begin{bmatrix} 0 \\ \omega_e \Psi_{pm}/L_q \end{bmatrix} \quad (2)$$

The design of a conventional vector controller may be based on a decoupled IPM motor model by neglecting the items involving ω in equation. (2), which may be normally treated as the compensation terms. Hence, the corresponding simplified transfer functions, 1/(RS+s·Ld) and 1/(RS+s·Lq), may be used to tune the conventional PI controllers for d- and q-axis loops respectively. After the d- and q-axis controllers are tuned, the compensation terms are added back to the output of the PI controllers to formulate the final control action. This approximation would cause a decoupling inaccuracy. In addition, there are only two parameters to tune for each PI controller which is hard to meet the optimal control demand especially as practical motor parameters, in terms of Ld, Lq and $\Psi_f$, could change over a large range. Issues like high overshoot current, low reliability under variable motor parameters, and difficulty to control an IPM motor in over-modulation regions have been reported by both industry and academic communities. To overcome the challenges, the ADP-based NN control strategy based on the complete IPM motor dynamic equation, given by eq. (2), is disclosed and described herein.

To develop an ADP-based controller NN 215, an ADP cost-to-go function is defined. In this disclosure, the ADP cost-to-go function for training the controller NN 215 may be the equation (3), in which $i_{sd}^*$ and $i_{sq}^*$ represent the stator d- and q-axis reference currents, respectively. The training objective may be to minimize the ADP cost-to-go function (3), i.e., to make the actual motor current $i_{sd}$ and $i_{sq}$ close to the reference motor current $i_{sd}^*$ and $i_{sq}^*$ as much as possible. The training algorithm details are presented herein.

$$C(\vec{i}_{x\_dq}) = \sum_{k=1}^{N} ([i_{sd}(k) - i_{sd}^*]^2 + [i_{sq}(k) - i_{sq}^*]^2) \quad (3)$$

Figure 3:
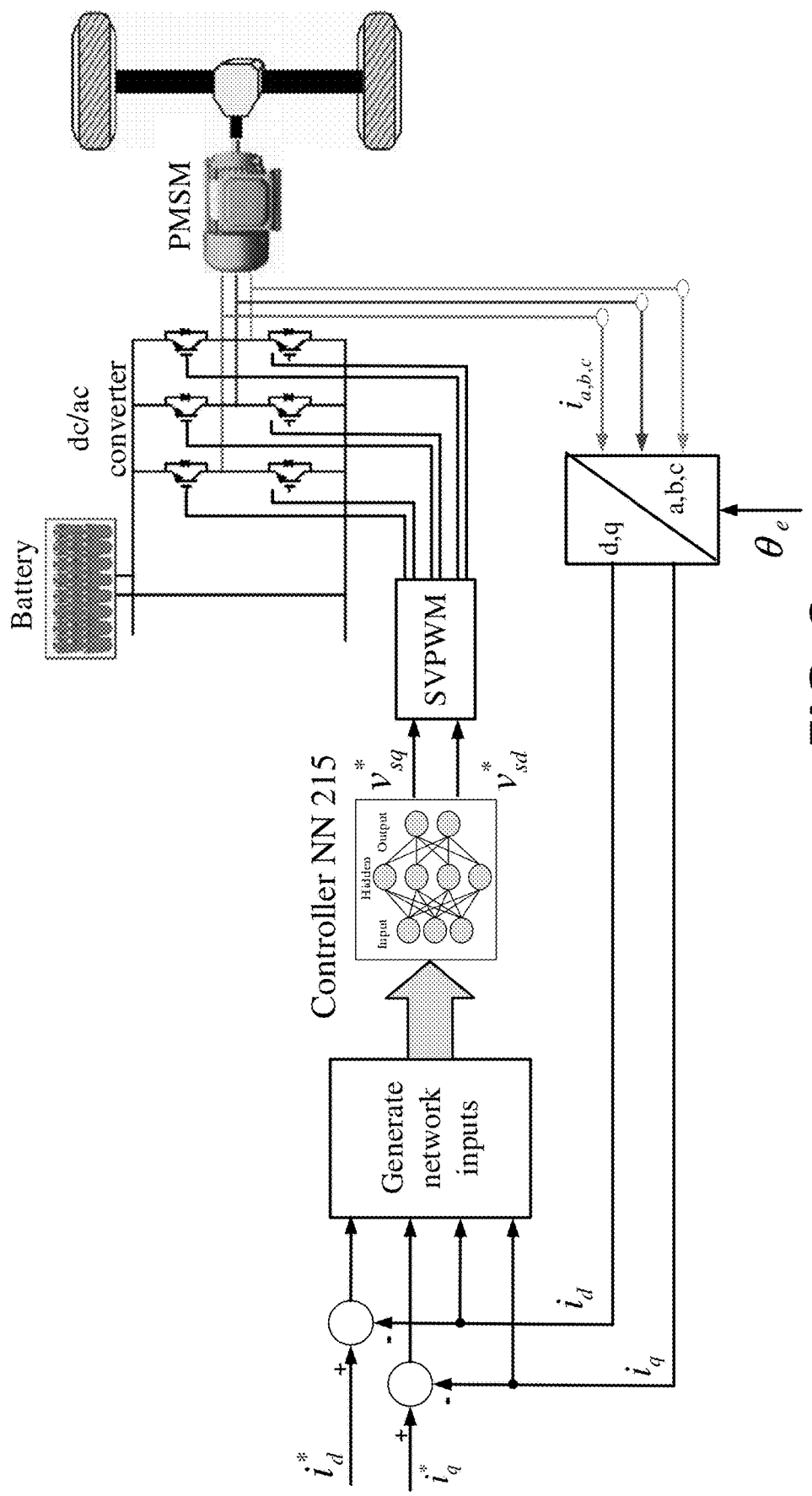
FIG. 3 illustrates an embodiment of an artificial NN (ANN)-based current-loop control structure.

The controller NN 215 comprises a fully connected deep multi-layer perceptron with weight vector w, an input layer, multiple hidden layers, output nodes, and possible shortcut connections between all pairs of layers. Inputs to the current-loop NN (i.e., the controller NN 215) may include 1) measured d and q-axis currents, 2) two error signals, 3) integrals of the error signals and 4) predictive signals as shown by FIG. 3. By this way, the advantages of conventional control techniques are integrated into the controller NN 215 design while avoiding their shortcomings in order to implement the optimal vector control suitable for a broad range of real-life IPM motor drive applications. For example, the integral terms may incorporate the advantages of conventional PI control methods, while the predictive terms incorporate the advantages of predictive control concepts. This interdisciplinary NN design approach greatly enhances the performance and ensures the reliability and adaptive capability of the controller NN 215, especially under practical conditions and physical system constraints.

The disclosed methods contain no system identification NNs that are typically used when developing an ADP-based controller NN 215. Instead, a mathematical model of the IPM motor as shown by the equation (2) is used but will consider the impact of the variable motor parameters during the training of the controller NN 215. In the proposed project, the stability of IPM motor drives and control is maintained when the control signal generated by the controller NN 215 is beyond the physical system's constraints such as motor operation in over or six-step modulation regions. In prior applications of grid-connected inverters, the controller NN 215 can be designed to hold or block the reactive power control loop while the effectiveness of the active power control is not affected when the control signals generated by the controller NN 215 are beyond the physical PWM saturation limitations. Similarly, the controller NN 215 is able to handle control in over and six-step modulation regions.

The current-loop NN controller (i.e., the controller NN 215) is capable of a quick response time, such as 1 ms or 0.1 ms, in order to reduce current distortion and torque oscillation of the IPM motor and fulfill the high-performance motor drive requirement. Hence, considering the integration in terms of cyber-physical systems (CPS), the NN 215 may be trained offline (see below) under a wide range of circumstances. This leads to several benefits for the CPS integration, including the controller NN 215 showing sufficient adaptive ability not to need retuning every time the motor's hardware parameters change slightly; the computational cost at runtime is extremely low, and easy to implement in low-cost hardware; and, as training is completed offline, it is not possible for the weights of the controller NN 215 to destabilize at runtime. In addition, to implement the controller NN 215 in real-time, a fast digital signal processor (DSP) such as, for example, a Texas Instruments (TI) TMS32010 or TMS32020 (Texas Instruments Inc., Dallas TX) for fast matrix multiplications may be used. The DSP multiplies in microseconds large matrices with their sizes only limited by the internal data memory. To significantly reduce the computing time needed for the controller NN 215, a best rational approximation to tanh(•) and/or a rectified linear unit (ReLU) activation function may be used.

Overall, these strategies may allow the controller NN 215 to be implemented in real-time for efficient CPS integration.

Estimating Motor Parameters, Speed and Position Based on ADP and NN

Position sensors may be necessary for conventional high-performance vector control of IPM motors. However, popular position sensors such as optical encoders and resolvers are usually bulky, mechanically vulnerable, and increase the implementation cost of the entire motor drive system. If the accuracy of the position sensor is unreliable, it may cause severe instability problems in the control loop. The main purpose of sensorless control algorithms is to estimate the position and the speed of the motor without using a position or a speed sensor. On the other hand, precise position estimation should be realized based on accurate motor parameters. Accurate motor parameter estimation is also important for effective flux weakening and MPTA as explained herein. However, motor parameters vary during the operation due to high temperature, demagnetization, etc. With such problems, simultaneous multiparameter identification (rotor position estimation and parameter estimation of motor inductance and permanent magnet flux) is undoubted to be necessary in high-performance IPM drives and senseless control system.

The traditional NN methods use feedforward networks and the backpropagation training algorithm. The methods are also based on the present error information between the estimated and actual stator currents to estimate the motor parameters. Thus, for all the traditional methods, the estimation accuracy and/or convergence are issues that have not been solved effectively, which influences the flux weakening and MPTA efficiency and heretofore made sensorless control unable to be applied to IPM motors.

Figure 4:
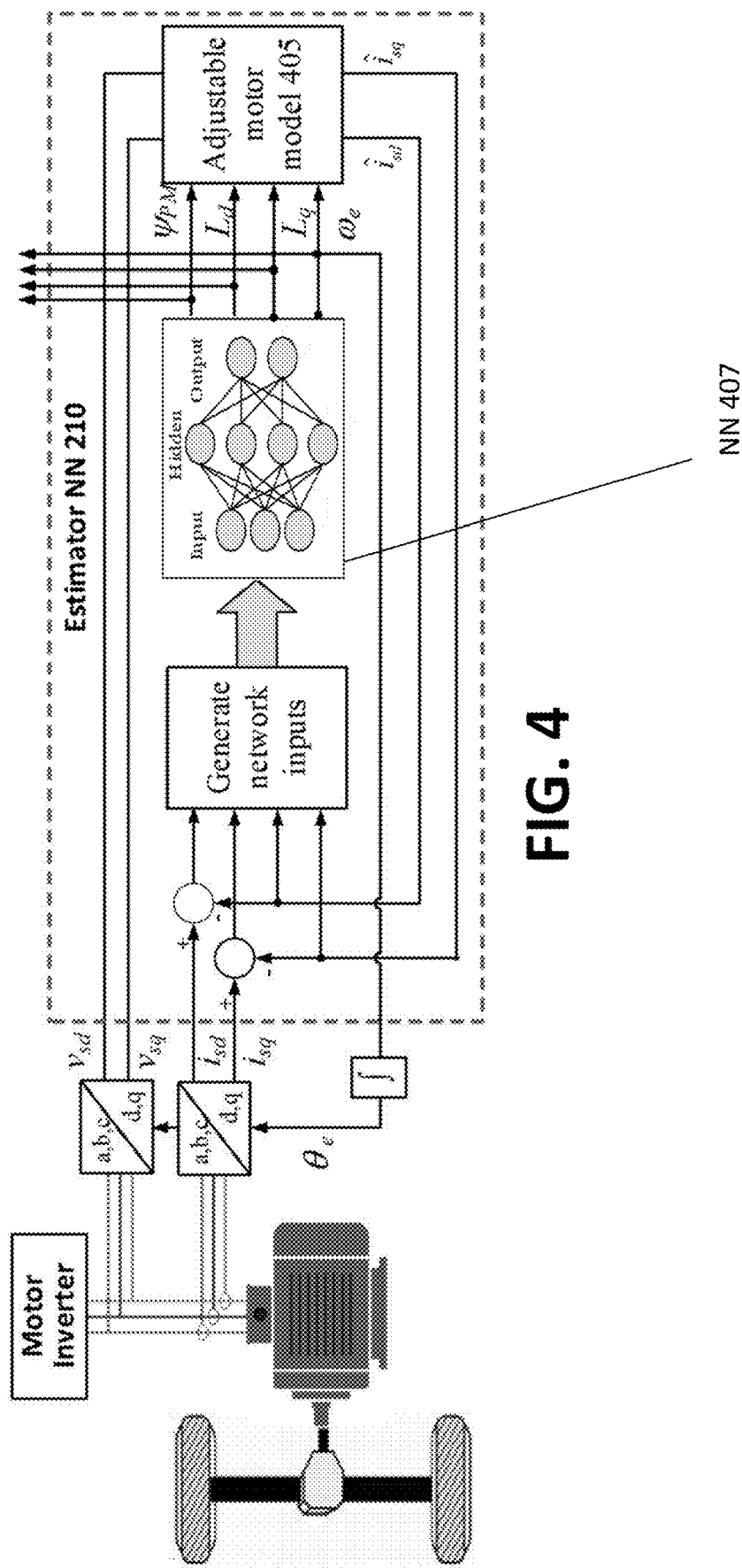
FIG. 4 illustrates an example of an estimator NN for IPM motor parameter estimation.

Details of the overall estimator NN 210 concept and structure are shown in FIG. 4, which comprises an Adjustable Motor Model 405 and an NN 407. The outputs of the NN 407 are the estimated motor parameters which will be applied to the Adjustable Motor Model 405 as shown by the equation (2). The output of the Adjustable Motor Model 405 is the estimated motor current based on the information of the voltage applied to the motor and the estimated motor parameters. The estimated motor currents, $\hat{i}_{sd}$ and $\hat{i}_{sq}$, feedback to the NN model 407 and are compared with the actual motor stator currents, $i_{sd}$ and $i_{sq}$, for motor parameter estimation at the next time step. The NN 407 must be trained before used for the parameter estimation. However, unlike conventional NN-based parameter estimation methods, an ADP-based strategy is used to train the NN 407 in order to achieve accurate estimation of motor parameters. The ADP cost-to-go function for the estimator NN 210 is given by the equation (4), and the NN 407 is trained to minimize the ADP cost-to-go function.

$$C\left(\vec{i}_{s\_dq}, \hat{\vec{i}}_{s\_dq}\right) = \sum_{k=1}^{N} \left( \left[i_{sd}(k) - \hat{i}_{sd}(k)\right]^2 + \left[i_{sq}(k) - \hat{i}_{sq}(k)\right]^2 \right) \quad (4)$$

Therefore, a significant feature of the ADP-NN based estimation (i.e., the estimator NN 210) is that the motor parameters are estimated based on information over a long time period or sequence instead of only the present error information. The NN 407 comprises a fully connected multi-layer perceptron with a weight vector, an input, hidden, output layers, and possible shortcut connections between all pairs of layers. Inputs to the NN 407 include 1) the estimated and actual motor current signals, 2) two error signals between the estimated and actual motor currents, and 3) integrals of the error signals. Information presented to the NN 407 allows the NN 407 to gain the benefits of conventional estimation techniques into the estimator NN 210 design in order to implement the optimal estimation of motor parameters.

After the training, the estimator NN 210 can integrate the advantages of conventional least square method, extended Kalman filter (EKF), back electromagnetic force-based methods, model predictive method, adaptive approaches, sliding-mode observer, and non-linear observer together, and provide a powerful estimation solution for IPM motor drives and sensorless control.

To make it possible for real-time implementation of the estimator NN 210, the NN 407 may be trained offline based on ADP. Initially, training may be based on the motor model (equation (2)) and the parameters of the model may be provided by the manufacturer in a lookup table, for example. If a new EV is put into operation, new training data in terms of motor voltage and current may be measured, collected, and saved into a data storage system within the EV. As sufficient data is collected and saved in the data storage system each day or month, the estimator NN 210 may be retrained with the purpose of letting the NN 407 be able to capture the updated motor parameter characteristics that may change over time after driving the EV over days or years. Generally, the training of the estimator NN 210 may be executed offline such as when the EV parks in a garage. Because there is no online training involved, it is much easier to achieve the NN-based real-time parameter estimation of an IPM motor in EV drives. In addition, unlike the motor current, estimation of motor speed, inductance and flux may be made at a much larger sampling time interval, such as 1 ms and above. This is because the motor speed cannot change instantly due to the motor inertia and the inductance and rotor flux estimation needed by the flux-weakening and MTPA block 105 (or the flux-weakening and MTPA NN 205) can be made at a much larger sampling time too.

Flux-Weakening and MTPA Based on NNs

Figure 5:
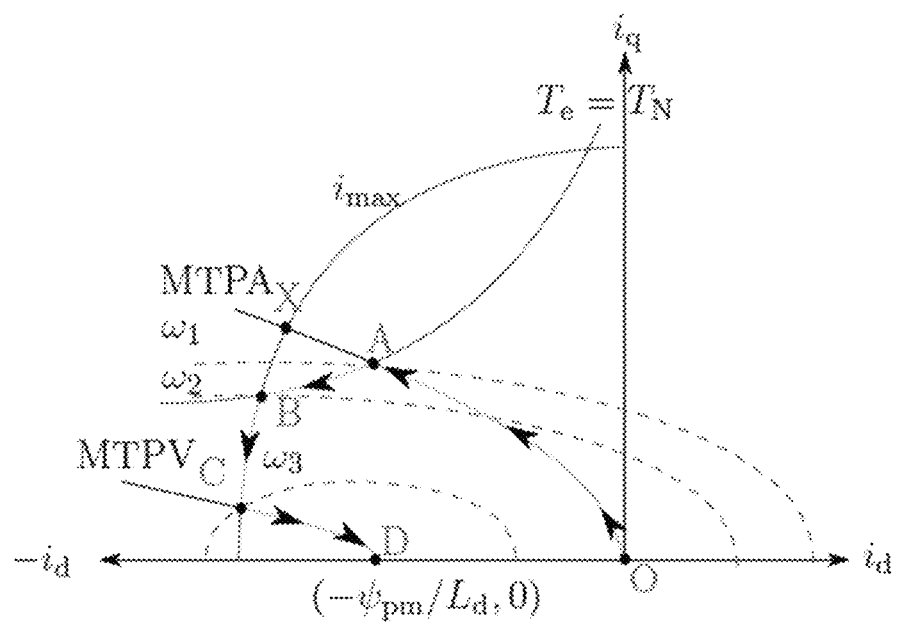
FIG. 5 illustrates an exemplary current vector trajectory for maximum torque per ampere (MTPA) and flux weakening.

As explained herein, for a given torque command, the optimization problem is solved to get the optimal d- and q-axis reference currents in order for the most efficient operation of an IPM motor. However, the optimization problem has two additional constraints: one is the rated current constraint of the IPM motor and the other is the PWM saturation constraint of the motor inverter. As a result, depending on motor running speed, solving the optimization problem involves four different portions (i.e., the portions OA, AB, BC, and CD) as shown by FIG. 5.

In the OA portion (MTPA), only the current constraint equation is considered, and the solution of the optimization problem can meet the demanded torque requirement. In the AB portion (flux weakening I), only the voltage constraint equation is considered, and the solution of the optimization problem can also meet the demanded torque requirement. In the BC portion, both the current and voltage constraint equations need to be considered but the solution of the optimization problem cannot meet the demanded torque requirement.

The CD portion (MTPA) occurs at very high speeds for an infinite speed drive system. In such a condition, current references are derived differently based on tangential intersection between the torque curves and the shrinking voltage ellipses. As a result, the corresponding algorithm needs to consider all the fours portions and solving the optimization problem is time consuming, which cannot be implemented to meet the real-time control demand in terms of the CPS integration. Therefore, the existing approaches are to solve the optimization problem using either simplified methods or lookup table approaches, which however are unable to provide correct and efficient current references to the current-loop controller of the IPM motor and thus affect the motor driving efficiency.

To overcome the challenge, an NN approximator is used to implement the optimal flux-weakening and MTPA functions. In order to achieve this goal, the optimization problem is solved offline for a large set of different torque, speed, and motor parameter conditions. This generates a large amount of reference d- and q-axis reference current data corresponding to optimal flux-weakening and MTPA at different conditions. These data are then used to train an NN approximator. The NN approximator has a deep neural network structure comprised of an input layer, hidden layers, and an output layer. The inputs of the NN approximator include desired torque, d- and q-axis inductances, flux linkage produced by the rotor magnet, and motor running speed. The outputs of the NN approximator are the reference d- and q-axis currents.

In some instances, the NN approximator is trained offline by using the EKF algorithm, one of the fastest and most effective NN training algorithms. Other training methods may be used. Since there is no online training involved, it would be much easier to implement the NN approximator for real-time control and operation of an IPM motor in EV drives and to integrate the cyber and physical portions of the system together. In addition, the desired torque command for driving an EV is generated at a much larger sampling time such as 10 ms or above, which would significantly reduce the computation needed for the NN approximator. This is because an outer-loop controller for EV mechanical traction systems usually responses at a much slower speed than an inner current-loop controller. Using these strategies, the NN approximator can be implemented and integrated with the IPM physical system under practical and real-time conditions.

Training NNs to Implement ADP-Based Optimal Control and Parameter Estimation

Figure 6:
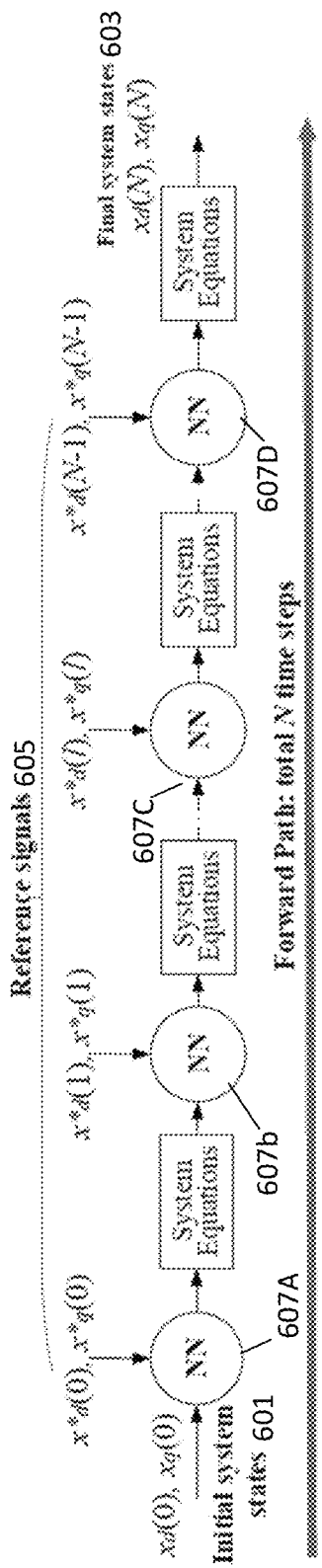
FIG. 6 illustrates an exemplary feedback loop between the NN and other parts of the combined NN and motor feedback system over time.

Both the controller NN 215 and the estimator NN 210 may be trained to implement ADP-based control or parameter estimation. Because each NN (FIG. 3 and FIG. 4, respectively) receives recurrent feedbacks, the combined system is treated as a recurrent neural network (RNN). This combined "recurrent network" is shown in FIG. 6, unrolled in time, illustrating how the different system parts interact with each other. The NNs 607 (i.e., the NNs 607A, 607B, 607C, and 607D) are trained using a new Forward Accumulation Through Time (FATT) algorithm suitable to HPC (high-performance computing) implementation, and an approach to integrate FATT with Levenberg-Marquardt Backpropagation (LMBP) to accelerate RNN training based on ADP. As shown, the NN 607A may receive initial system states 601 along with reference signals 605 and may output system equations to the neural network 607B. The NN 607B may receive the system equations along with reference signals 605 and may output updated system equations to the neural network 607C. The NN 607D may receive the updated system equations along with reference signals 605 and may output updated system equations (i.e., the final system states 603).

ADP employs the principle of Bellman's optimality and is a very useful tool for solving optimization and optimal control problems. The typical structure of discrete-time ADP includes a discrete-time state-space system model and a performance index or cost associated with the system. The ADP cost-to-go function may be equation (3) for the current controller of an IPM motor and may be equation (4) for the motor parameter estimation problem. The objective of the training may be to find an optimal trajectory of control or estimation action from the controller NN 215 or the estimator NN 210 that minimizes the cost function given by the equations (3) or (4).

To benefit the parallel implementation of the RNN training algorithm on an HPC platform, LMBP may be used to train the controller NN 215 and the estimator NN 210. LMBP combines the speed of Newton's method and the guaranteed convergence of steepest descent; thus, LMBP appears to be the fastest NN training algorithm for a moderate number of network parameters. However, LMBP cannot train RNNs directly. In order to use LMBP for RNN training, the cost function (equations (3) and (4)) may be modified by rewriting as shown in the equation (5), where $U(\vec{e}_{dq}(k))=[i_{sd}(k)-i^*_{sd}]^2+[i_{sq}(k)-i^*_{sq}]^2$ for the current control problem and $U(\vec{e}_{dq}(k))=[i_{sd}(k)-\hat{i}_{sd}(k)]^2+[i_{sq}(k)-\hat{i}_{sq}]^2$ for the parameter estimation problem. Then, the gradient $$\frac{\partial C}{\partial \vec{w}}$$

can be written in matrix form (6):

$$C = \sum_{k=1}^{N} U(\vec{e}_{dq}(k)) \xrightarrow{\text{define } V(k)=\sqrt{C(\vec{e}_{dq}(k))}} C = \sum_{k=1}^{N} (V(k))^2 \qquad (5)$$

$$\frac{\partial C}{\partial \vec{w}} = \frac{\partial \sum_{k=1}^{N} [V(k)]^2}{\partial \vec{w}} = \sum_{k=1}^{N} 2V(k) \frac{\partial V(k)}{\partial \vec{w}} = 2J(\vec{w})^T \vec{V} \qquad (6)$$

where the Jacobian matrix $J(\vec{w})$ is given by the equation (7), below. Therefore, the weight update can be expressed by the equation (8):

$$J(\vec{w}) = \begin{bmatrix} \frac{\partial V(1)}{\partial w_1} & \cdots & \frac{\partial V(1)}{\partial w_M} \\ \vdots & \ddots & \vdots \\ \frac{\partial V(N)}{\partial w_1} & \cdots & \frac{\partial V(N)}{\partial w_M} \end{bmatrix}, \vec{V} = \begin{bmatrix} V(1) \\ \vdots \\ V(N) \end{bmatrix} \qquad (7)$$

$$\Delta \vec{w} = -[J(\vec{w})^T J(\vec{w}) + \mu I]^{-1} J(\vec{w})^T \vec{V} \qquad (8)$$

The matrix computation shown above, however, may be computationally expensive on a sequential machine but is suitable for a parallel machine. In order to calculate the Jacobian matrix $J(\vec{w})$ efficiently in HPC environment, a Forward Accumulation Through Time (FATT) algorithm may be used. The concept of the FATT algorithm is also illustrated in FIG. 6. Generally, in order to calculate the Jacobian matrix, every trajectory needs to be expanded forward through time. The FATT algorithm computes the Jacobian matrix $J(\vec{w})$, unrolls the system trajectory and calculates both system states together at each time step. Thus, only one loop is needed for unrolling the system trajectory and calculating the Jacobian matrix $J(\vec{w})$.

Figure 7:
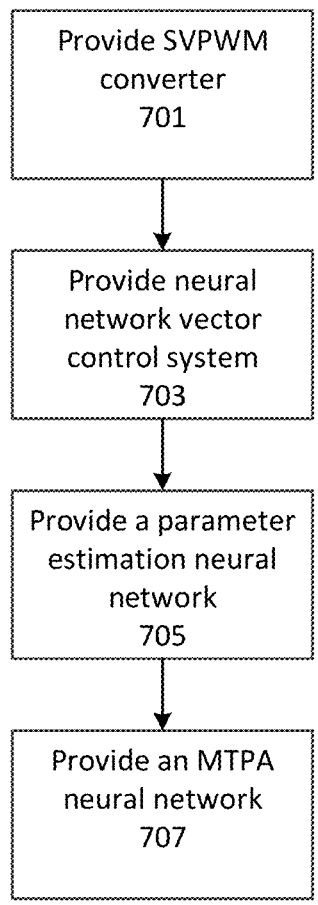
FIG. 7 illustrates an exemplary method for controlling an IPM AC electrical machine.

FIG. 7 is an illustration of an example method 700 for controlling an interior-mounted permanent magnet (IPM) alternating-current (AC) electrical machine. The method 700 may be implemented by a manufacturer or entity associated with the IPM AC electrical machine.

At 701, a space vector pulse-width modulated (SVPWM) converter is provided. The SVPWM converter may be operably connected between an electrical power source and the IPM AC electrical machine.

At 703, a neural network vector control system is provided. The neural network vector control system may be operably connected to the SVPWM converter. The neural network vector control system may include a controller neural network configured and trained to implement an approximate dynamic programming (ADP) algorithm. The neural network vector control system may be trained at times when the IPM AC electrical machine is not operating.

At 705, a parameter estimator neural network is provided. The parameter estimator neural network may receive as inputs actual d and q-axis currents and actual d and q-axis voltages representative of current and voltage output from the SVPWM converter. The parameter estimator neural network may capture and estimate parameters for the IPM AC electrical machine. An adjustable IPM motor model may be applied with the parameter estimator neural network to provide estimated d and q-axis currents. The estimated d and q-axis currents may be compared with the actual d and q-axis currents and fed-back as inputs to the estimator neural network. The parameter estimator neural network may be trained to implement an ADP algorithm and the parameter estimator neural network system may be trained at times when the IPM AC electrical machine is not operating.

At 707, a flux weakening and maximum torque per ampere (MTPA) neural network is provided. The flux-weakening and MTPA neural network may receive as an input a desired torque command and may receive as inputs from the parameter estimator neural network $L_d$, $L_q$, $\omega_e$, and $\Psi_{pm}$. $L_d$ and $L_q$ may be stator d- and q-axis inductances. $\omega_e$ may be the IPM AC electrical machine's electrical rotational speed, and $\Psi_{pm}$ may be a flux linkage of a permanent rotor magnet of the IPM AC electrical machine. The rotor position of the IPM AC electrical machine may be estimated from $\omega_e$ using the parameter estimator neural network and the rotor position may be used to convert the current and voltage outputs from the SVPWM converter to their d and q-axis currents and d and q-axis voltages representative of current and voltage output from the SVPWM converter.

Figure 8:
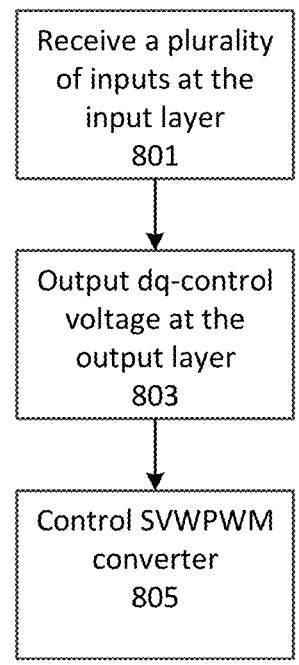
FIG. 8 illustrates an exemplary method for operating a controller NN in an IPM AC machine.

FIG. 8 is an illustration of an example method 800 for operating a controller NN 215 in an interior-mounted permanent magnet (IPM) alternating-current (AC) electrical machine. The method 800 may be implemented by the controller NN 215. The controller NN 215 may be a feed-forward network that includes an input layer, multiple hidden layers and an output layer.

At 801, a plurality of inputs is received at the input layer of the controller NN 215. The plurality of inputs may include at least reference d and q-axis stator currents from the flux-weakening and MTPA neural network and d and q-axis actual stator currents as well as other signals that can be generated from the reference and actual d and q-axis stator currents, such as error signals between the reference and actual stator currents and integrals of the error signals.

At 803, a compensating dq-control voltage is output at the output layer of the controller NN 215. The controller NN 215 may be configured to optimize the compensating dq-control voltage based on the plurality of inputs.

At 805, the SVPWM converter is controlled using the compensating dq-control voltage.

Figure 9:
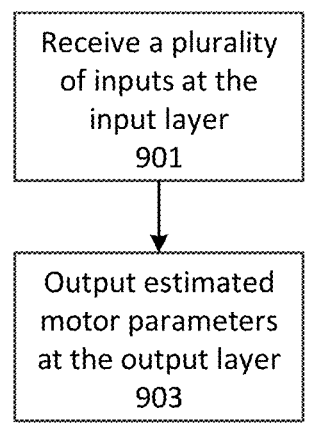
FIG. 9 illustrates an exemplary method for operating an estimator NN in an IPM AC machine.

FIG. 9 is an illustration of an example method 900 for operating an estimator NN 210 in an interior-mounted permanent magnet (IPM) alternating-current (AC) electrical machine. The method 900 may be implemented by the estimator NN 210 (i.e., the parameter estimator NN). The estimator NN 210 may be a feedforward network that includes an input layer, multiple hidden layers and an output layer.

At 901, a plurality of inputs is received at the input layer of the estimator NN 210. The plurality of inputs may include at least d and q-axis actual stator currents and estimated d and q-axis stator currents from an adjustable IPM motor model as well as other signals that can be generated from the actual and estimated d and q-axis stator currents, such as error signals between the estimated and actual stator currents and integrals of the error signals.

At 903, estimated motor parameters $L_d$, $L_q$, $\omega_e$, and $\Psi_{pm}$ are output by the output layer of the estimator NN 210. The estimator NN 210, together with the adjustable IPM motor model, may be configured to optimize the IPM motor parameter estimation based on the plurality of inputs.

Computing Environment

Figure 10:
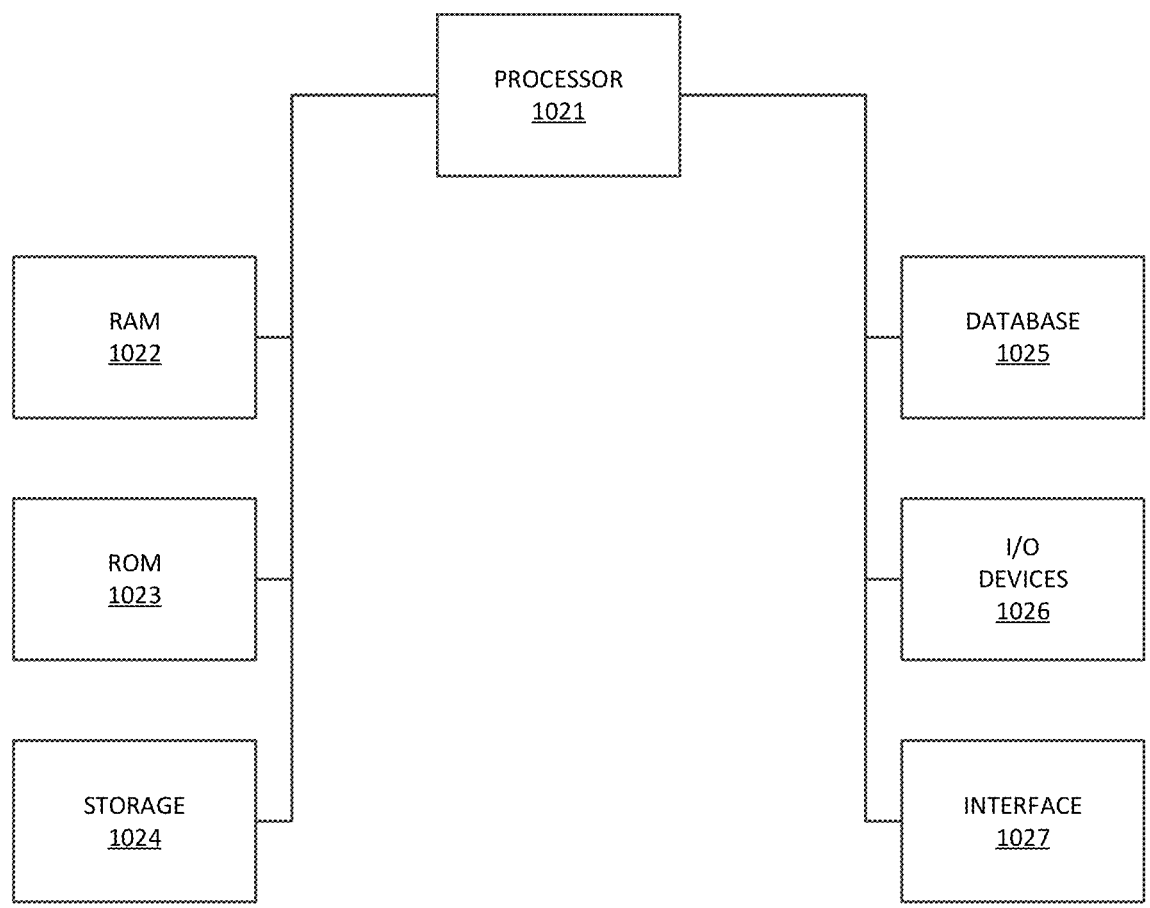
FIG. 10 illustrates an exemplary computer comprising at least a processor and a memory that can be used for controlling a permanent magnet motor.

The above system has been described above as comprised of units. One skilled in the art will appreciate that this is a functional description and that the respective functions can be performed by software, hardware, or a combination of software and hardware. A unit can be software, hardware, or a combination of software and hardware. The units can comprise software for controlling an induction motor. In one exemplary aspect, the units can comprise a control system that comprises one or more computing devices that comprise a processor 821 as illustrated in FIG. 10 and described below. As used herein, processor refers to a physical hardware device that executes encoded instructions for performing functions on inputs and creating outputs. The computer and/or processor may be used to comprise all or portions of the described neural networks.

FIG. 10 illustrates an exemplary computer that can be used for controlling an interior-mounted permanent magnet (IPM) alternating-current (AC) electrical machine such as an IPM induction motor. As used herein, "computer" may include a plurality of computers. The computers may include one or more hardware components such as, for example, a processor 1021, a random-access memory (RAM) module 1022, a read-only memory (ROM) module 1023, a storage 1024, a database 1025, one or more input/output (I/O) devices 1026, and an interface 1027. Alternatively, and/or additionally, the computer may include one or more software components such as, for example, a computer-readable medium including computer executable instructions for performing a method associated with the exemplary embodiments. It is contemplated that one or more of the hardware components listed above may be implemented using software. For example, storage 1024 may include a software partition associated with one or more other hardware components. It is understood that the components listed above are exemplary only and not intended to be limiting.

Processor 1021 may include one or more processors, each configured to execute instructions and process data to perform one or more functions associated with a computer for controlling an induction motor. Processor 1021 may be communicatively coupled to RAM 1022, ROM 1023, storage 1024, database 1025, I/O devices 1026, and interface 1027. Processor 1021 may be configured to execute sequences of computer program instructions to perform various processes. The computer program instructions may be loaded into RAM 1022 for execution by processor 1021.

RAM 1022 and ROM 1023 may each include one or more devices for storing information associated with operation of processor 1021. For example, ROM 1023 may include a memory device configured to access and store information associated with the computer, including information for identifying, initializing, and monitoring the operation of one or more components and subsystems. RAM 1022 may include a memory device for storing data associated with one or more operations of processor 1021. For example, ROM 1023 may load instructions into RAM 1022 for execution by processor 1021.

Storage 1024 may include any type of mass storage device configured to store information that processor 1021 may need to perform processes consistent with the disclosed embodiments. For example, storage 1024 may include one or more magnetic and/or optical disk devices, such as hard drives, CD-ROMs, DVD-ROMs, or any other type of mass media device.

Database 1025 may include one or more software and/or hardware components that cooperate to store, organize, sort, filter, and/or arrange data used by the computer and/or processor 1021. For example, database 1025 may store data related to the control of an induction motor. The database may also contain data and instructions associated with computer-executable instructions for controlling an induction motor. It is contemplated that database 1025 may store additional and/or different information than that listed above.

I/O devices 1026 may include one or more components configured to communicate information with a user associated with computer. For example, I/O devices may include a console with an integrated keyboard and mouse to allow a user to maintain a database of digital images, results of the analysis of the digital images, metrics, and the like. I/O devices 1026 may also include a display including a graphical user interface (GUI) for outputting information on a monitor. I/O devices 1026 may also include peripheral devices such as, for example, a printer, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 1027 may include one or more components configured to transmit and receive data via a communication network, such as the Internet, a local area network, a workstation peer-to-peer network, a direct link network, a wireless network, or any other suitable communication platform. For example, interface 1027 may include one or more modulators, demodulators, multiplexers, demultiplexers, network communication devices, wireless devices, antennas, modems, and any other type of device configured to enable data communication via a communication network.

The figures illustrate the architecture, functionality, and operation of possible implementations of systems, methods and computer program products according to various implementations of the present invention. In this regard, each block of a flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

Any combination of one or more computer readable medium(s) may be used to implement the systems and methods described hereinabove. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Various changes and modifications to the disclosed embodiments will be apparent to those skilled in the art. Such changes and modifications, including without limitation those relating to the chemical structures, substituents, derivatives, intermediates, syntheses, compositions, equationtions, or methods of use of the invention, may be made without departing from the spirit and scope thereof.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced, including the references sited below. The disclosures of these publications in their entireties are hereby incorporated by reference into this application in order to more fully describe the state of the art to which the methods and systems pertain and to illustrate improvements over the present state of the art in claimed invention.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed:

1. A method for controlling an interior-mounted permanent magnet (IPM) alternating-current (AC) electrical machine by:
   providing a space vector pulse-width modulated (SVPWM) converter operably connected between an electrical power source and the IPM AC electrical machine;
   providing a neural network vector control system operably connected to the SVPWM converter, the neural network vector control system comprising a controller neural network configured and trained to implement an approximate dynamic programming (ADP) algorithm, wherein the neural network vector control system is trained at times when the IPM AC electrical machine is not operating;
   providing a parameter estimator neural network, wherein the parameter estimator neural network receives as inputs actual d and q-axis currents and actual d and q-axis voltages representative of current and voltage output from the SVPWM converter, wherein the parameter estimator neural network captures and estimates parameters for the IPM AC electrical machine, wherein an adjustable IPM motor model is applied with the parameter estimator neural network to provide estimated d and q-axis currents, wherein the estimated d and q-axis currents are compared with the actual d and q-axis currents and fed-back as inputs to the estimator neural network, and wherein the parameter estimator neural network is trained to implement an ADP algorithm and the parameter estimator neural network system is trained at times when the IPM AC electrical machine is not operating;

providing a flux weakening and maximum torque per ampere (MTPA) neural network comprising an input layer, multiple hidden layers and an output layer, wherein the flux-weakening and MTPA neural network receives as an input a desired torque command and receives as inputs from the parameter estimator neural network at the input layer a reference torque $L_d$, $L_q$, $\omega_e$, and $\psi_{pm}$, wherein $L_d$ and $L_q$ are stator d- and q-axis inductances, $\omega_e$ is the IPM AC electrical machine's electrical rotational speed, and $\psi_{pm}$ is a flux linkage of a permanent rotor magnet of the IPM AC electrical machine, and wherein the rotor position of the IPM AC electrical machine is estimated from co, using the parameter estimator neural network and the rotor position is used to convert the current and voltage outputs from the SVPWM converter to their d and q-axis currents and d and q-axis voltages representative of current and voltage output from the SVPWM converter, wherein the flux-weakening and MTPA neural network outputs the d and q-axis currents to the controller neural network at the output layer as reference d and q-axis stator currents, wherein the flux-weakening and MTPA neural network is trained to minimize a cost function, and wherein the cost function can be used to measure how close the reference d and q-axis stator currents from the flux-weakening and MTPA neural network match the ideal optimal reference d and q-axis stator currents for different reference torque and motor parameters.

2. The method of claim 1, wherein the neural network vector control system includes controller neural network, wherein the controller neural network is a feedforward network comprising an input layer, multiple hidden layers and an output layer, wherein the controller neural network:

receives a plurality of inputs at the input layer, wherein the plurality of inputs include at least reference d and q-axis stator currents from the flux-weakening and MTPA neural network and d and q-axis actual stator currents and other signals that can be generated from the reference and actual d and q-axis stator currents, wherein the other signals comprise error signals between the reference and actual d and q-axis stator currents and integrals of the error signals;

outputs a compensating dq-control voltage at the output layer, wherein the controller neural network is configured to optimize the compensating dq-control voltage based on the plurality of inputs; and controls the SVPWM converter using the compensating dq-control voltage, wherein the controller neural network is trained as a recurrent network to minimize a cost function of the ADP algorithm using a forward accumulation through time ("FATT") algorithm, wherein the cost function can be used to measure how close the actual motor d and q-axis stator currents match the reference d and q-axis stator currents, wherein the controller neural network is trained offline at times when the IPM AC electrical machine is not operating.

3. The method of claim 1, wherein the parameter estimator neural network is a feedforward network comprising an input layer, multiple hidden layers and an output layer, wherein said parameter estimator neural network:

receives a plurality of inputs at the input layer, wherein the plurality of inputs include at least d and q-axis actual stator currents and estimated d and q-axis stator currents from an adjustable IPM motor model and other signals that can be generated from the actual and estimated d and q-axis stator currents, wherein the other signals comprise error signals between the estimated and actual d and q-axis stator currents and integrals of the error signals; and outputs estimated motor parameters $L_d$, $L_q$, $\omega_e$, and $\psi_{pm}$ at the output layer, wherein the parameter estimator neural network together with the adjustable IPM motor model is configured to optimize the IPM motor parameter estimation based on the plurality of inputs;

wherein the parameter estimator neural network is trained as a recurrent network to minimize a cost function of the ADP algorithm using a forward accumulation through time ("FATT") algorithm, wherein the cost function can be used to measure how close the estimated d and q-axis stator currents from the adjustable IPM motor model match the actual d and q-axis stator currents, wherein the adjustable IPM motor model receives estimated motor parameters $L_d$, $L_q$, $\omega_e$, and $\psi_{pm}$ from the parameter estimator neural network as well as the actual d and q-axis stator voltages of the IPM motor, and outputs the estimated d and q-axis stator currents, wherein the parameter estimator neural network is trained offline at times when the IPM AC electrical machine is not operating, wherein from the estimated motor parameters, an electrical rotational speed of the IPM AC electrical machine and a rotor position of the IPM AC electrical machine can be obtained, wherein the estimated electrical rotational speed and the estimated rotor position can enable sensorless control for the IPM AC electrical machine.

4. The method of claim 1, wherein the cost function is one of a Levenberg-Marquardt or a backpropagation training algorithm.

5. The method of claim 1, wherein the flux-weakening and MTPA neural network is trained offline at times when the IPM AC electrical machine is not operating.

6. A system for controlling an interior-mounted permanent magnet (IPM) alternating-current (AC) electrical machine comprising:

a space vector pulse-width modulated (SVPWM) converter operably connected between an electrical power source and the IPM AC electrical machine;

a neural network vector control system operably connected to the SVPWM converter, the neural network vector control system comprising a processor and a controller neural network configured to implement an approximate dynamic programming (ADP) algorithm for training the neural network vector control system when the IPM AC electrical machine is not operating;

a parameter estimator neural network operably connected to an output of the SVPWM converter through a dq-axis converter, wherein the parameter estimator neural network comprises a processor and wherein the parameter estimator neural network is configured to receive as inputs d and q-axis currents and d and q-axis voltages representative of current and voltage output from the SVPWM converter, capture and estimate parameters for the IPM AC electrical machine including at least an electrical rotational speed of the IPM AC electrical machine and a rotor position of the IPM AC electrical machine, and implement an ADP training algorithm, wherein an adjustable IPM motor model is applied with the parameter estimator neural network to provide the estimated d and q-axis currents, wherein the estimated d and q-axis currents are compared with actual d and q-axis currents and fed-backed as inputs to the estimator neural network, wherein the parameter estimator neural network system is trained at times when the IPM AC electrical machine is not operating;

a flux weakening and maximum torque per ampere (MTPA) neural network operably connected to the neural network vector control system and the parameter estimator neural network, wherein the flux-weakening and MTPA neural network comprises at least a processor, an input layer, multiple hidden layers and an output layer, and is configured to receive as an input a desired torque command and receive as inputs from the parameter estimator neural network at the input layer a reference torque, $L_d$, $L_q$, $\omega_e$, and $\psi_{pm}$, wherein $L_d$ and $L_q$ are stator d- and q-axis inductances, $\omega_e$ is the IPM AC electrical machine's electrical rotational speed, and $\psi_{pm}$ is a flux linkage of a permanent rotor magnet of the IPM AC electrical machine, and wherein the rotor position of the IPM AC electrical machine is estimated from $\omega_e$ using the parameter estimator neural network and the rotor position is used to convert the current and voltage outputs from the SVPWM converter to their d and q-axis currents and d and q-axis voltages representative of current and voltage output from the SVPWM converter, wherein the flux-weakening and MTPA neural network is configured to output the d and q-axis currents to the controller neural network at the output layer as reference d and q-axis stator currents, wherein the flux-weakening and MTPA neural network is trained to minimize a cost function, and wherein the cost function can be used to measure how close the reference d and q-axis stator currents from the flux-weakening and MTPA neural network match the ideal optimal reference d and q-axis stator currents for different reference torque and motor parameters.

7. The system of claim 6, wherein the controller neural network is a feedforward network comprising an input layer, multiple hidden layers and an output layer, wherein the controller neural network:

receives a plurality of inputs at the input layer, wherein the plurality of inputs include at least reference d and q-axis stator currents from the flux-weakening and MTPA neural network, d and q-axis actual stator currents, and other signals that can be generated from the reference d and q-axis stator currents and actual d and q-axis stator currents, wherein the other signals include error signals between the reference and actual stator currents and integrals of the error signals;

outputs a compensating dq-control voltage at the output layer, wherein the controller neural network is configured to optimize the compensating dq-control voltage based on the plurality of inputs; and controls the SVPWM converter using the compensating dq-control voltage, wherein the controller neural network is trained as a recurrent network to minimize a cost function of the ADP algorithm using a forward accumulation through time ("FATT") algorithm, wherein the cost function can be used to measure how close the actual d and q-axis stator currents match the reference d and q-axis stator currents, wherein the controller neural network is trained offline at times when the IPM AC electrical machine is not operating.

8. The system of claim 6, wherein the parameter estimator neural network is a feedforward network comprising an input layer, multiple hidden layers and an output layer, wherein said parameter estimator neural network:

receives a plurality of inputs at the input layer, wherein the plurality of inputs include at least d and q-axis actual stator currents and estimated d and q-axis stator currents from an adjustable IPM motor model and other signals that can be generated from the actual and estimated d and q-axis stator currents, wherein the other signals include error signals between the estimated and actual stator currents and integrals of the error signals; and outputs estimated motor parameters $L_d$, $L_q$, $\omega_e$, and $\psi_{pm}$ at the output layer, wherein the parameter estimator neural network together with adjustable IPM motor model is configured to optimize the IPM motor parameter estimation based on the plurality of inputs;

wherein the parameter estimator neural network is trained as a recurrent network to minimize a cost function of the ADP algorithm using a forward accumulation through time ("FATT") algorithm, wherein the cost function can be used to measure how close the estimated d and q-axis stator currents from the adjustable IPM motor model match the actual d and q-axis stator currents, wherein the adjustable IPM motor model receives estimated motor parameters $L_d$, $L_q$, $\omega_e$, and $\psi_{pm}$ from the parameter estimator neural network as well as the actual d and q-axis stator voltages of the IPM motor, and outputs the estimated d and q-axis stator currents, wherein the parameter estimator neural network is trained offline at times when the IPM AC electrical machine is not operating, wherein from the estimated motor parameters, an electrical rotational speed of the IPM AC electrical machine and a rotor position of the IPM AC electrical machine can be obtained, wherein the estimated electrical rotational speed and the estimated rotor position can enable sensorless control for an IPM AC electrical machine.

9. The system of claim 6, wherein the cost function is one of a Levenberg-Marquardt or a backpropagation training algorithm.

10. The system of claim 6, wherein the flux-weakening and MTPA neural network is trained offline at times when the IPM AC electrical machine is not operating.

11. A system for controlling an interior-mounted permanent magnet (IPM) alternating-current (AC) electrical machine comprising:

a space vector pulse-width modulated (SVPWM) converter operably connected between an electrical power source and the IPM AC electrical machine;

a neural network vector control system operably connected to the SVPWM converter, the neural network vector control system comprising a processor and a controller neural network configured to implement an algorithm for training the neural network vector control system when the IPM AC electrical machine is not operating;

a parameter estimator neural network operably connected to an output of the SVPWM converter through a converter, wherein the parameter estimator neural network comprises a processor and wherein the parameter estimator neural network is configured to receive as inputs d and q-axis currents and d and q-axis voltages representative of current and voltage output from the SVPWM converter, capture and estimate parameters for the IPM AC electrical machine including at least an electrical rotational speed of the IPM AC electrical machine and a rotor position of the IPM AC electrical machine, and implement an ADP training algorithm;

a flux weakening and maximum torque per ampere (MTPA) neural network operably connected to the neural network vector control system and the parameter estimator neural network, wherein the flux-weakening and MTPA neural network comprises at least a processor, an input layer, multiple hidden layers and an output layer, and is configured to receive as an input a desired torque command and receive as inputs from the parameter estimator neural network at the input layer a reference torque, $L_d$, $L_q$, $\omega_e$, and $\psi_{pm}$ wherein $L_d$ and $L_q$ are stator d- and q-axis inductances, $\omega_e$ is the IPM AC electrical machine's electrical rotational speed, and $\psi_{pm}$ is a flux linkage of a permanent rotor magnet of the IPM AC electrical machine, and wherein the rotor position of the IPM AC electrical machine is estimated from $\omega_e$ using the parameter estimator neural network, wherein the flux-weakening and MTPA neural network is configured to output the d and q-axis currents to the controller neural network at the output layer as reference d and q-axis stator currents, wherein the flux-weakening and MTPA neural network is trained to minimize a cost function, and wherein the cost function can be used to measure how close the reference d and q-axis stator currents from the flux-weakening and MTPA neural network match the ideal optimal reference d and q-axis stator currents for different reference torque and motor parameters.

12. The system of claim 11, wherein the algorithm comprises an approximate dynamic programming (ADP) algorithm.

13. The system of claim 11, wherein the converter is a dq-axis converter.

14. The system of claim 11, wherein the parameter estimator neural network system is trained at times when the IPM AC electrical machine is not operating.

15. The system of claim 11, wherein, the estimated d and q-axis currents are compared with actual d and q-axis currents and fed-back as inputs to the estimator neural network.

16. The system of claim 11, wherein an adjustable IPM motor model is applied with the parameter estimator neural network to provide the estimated d and q-axis currents.

17. The system of claim 11, wherein the rotor position is used to convert the current and voltage outputs from the SVPWM converter to d and q-axis currents and d and q-axis voltages representative of current and voltage output from the SVPWM converter.

18. The system of claim 11, wherein the parameter estimator neural network system is trained using a cloud-computing environment.

* * * * *

UNITED STATES PATENT AND TRADEMARK OFFICE
CERTIFICATE OF CORRECTION

| | | |
|---|---|---|
| PATENT NO. | : 11,876,464 B2 | Page 1 of 1 |
| APPLICATION NO. | : 16/790055 | |
| DATED | : January 16, 2024 | |
| INVENTOR(S) | : Shuhui Li et al. | |

It is certified that error appears in the above-identified patent and that said Letters Patent is hereby corrected as shown below:

In the Claims

In Column 23, Line 13 of Claim 1, "…torque…" should read -- torque, --
In Column 23, Line 19 of Claim 1, "…co," should read -- $\omega_e$ --

Signed and Sealed this
Twentieth Day of February, 2024

Katherine Kelly Vidal
*Director of the United States Patent and Trademark Office*